(12) United States Patent
Santini et al.

(10) Patent No.: US 12,030,647 B2
(45) Date of Patent: Jul. 9, 2024

(54) THERMAL ANTI-ICE BYPASS SYSTEMS FOR USE WITH AIRCRAFT

(71) Applicant: The Boeing Company, Chicago, IL (US)

(72) Inventors: Gregory M. Santini, Bothell, WA (US); Kevin R. Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/675,889

(22) Filed: Feb. 18, 2022

(65) Prior Publication Data

US 2023/0264820 A1 Aug. 24, 2023

(51) Int. Cl.
*B64D 15/04* (2006.01)
*B64C 9/26* (2006.01)

(52) U.S. Cl.
CPC ............... *B64D 15/04* (2013.01); *B64C 9/26* (2013.01)

(58) Field of Classification Search
CPC .......... B64C 3/50; B64C 7/00; B64C 23/076; B64C 9/24; B64D 15/02; B64D 15/04
See application file for complete search history.

(56) References Cited

U.S. PATENT DOCUMENTS

| | | | | |
|---|---|---|---|---|
| 4,230,295 A * | 10/1980 | Eppler | ................... | B63H 25/38 |
| | | | | 16/370 |
| 6,375,126 B1* | 4/2002 | Sakurai | ................... | B64C 3/50 |
| | | | | 244/214 |
| 9,896,190 B1* | 2/2018 | Amorosi | ................... | B64C 3/14 |
| 10,899,430 B2* | 1/2021 | Gallien | ..................... | B64C 9/22 |
| 2010/0176243 A1 | 7/2010 | Nieman et al. | | |
| 2019/0359341 A1* | 11/2019 | Meis | ...................... | B64D 15/20 |
| 2020/0307765 A1* | 10/2020 | Antunes | .................... | B64C 9/22 |
| 2021/0024220 A1* | 1/2021 | Burton | ................... | B64D 15/04 |

* cited by examiner

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

Thermal anti-icing systems are disclosed. An example anti-icing system includes a housing defining an inner recess, a first support fitting, a second support fitting spaced away from the first support fitting. The housing is positioned between the first support fitting and the second support fitting. The first support fitting, the second support fitting and an outer wall of the housing define a heating chamber that is fluidly separated from the inner recess.

22 Claims, 14 Drawing Sheets

THERMAL ANTI-ICE BYPASS SYSTEMS FOR USE WITH AIRCRAFT

FIELD OF DISCLOSURE

The present disclosure relates generally to aircraft and, more particularly, to thermal anti-ice systems for use with aircraft.

BACKGROUND

Commercial aircraft typically employ bleed air systems to provide heated air for anti-icing applications. Air supply to these systems is typically provided by bleed air extracted from a compressor of an aircraft engine. To meet pressure and/or temperature demands of a thermal anti-icing system, bleed air is often extracted from a higher stage of the compressor that provides bleed air having a relatively high temperature and/or pressure.

SUMMARY

An example thermal anti-icing system includes a housing defining an inner recess, a first support fitting, a second support fitting spaced away from the first support fitting. The housing is positioned between the first support fitting and the second support fitting. The first support fitting, the second support fitting and an outer wall of the housing define a heating chamber that is fluidly separated from the inner recess.

An example system includes a housing having: a first wall defining a first inner surface and a first outer surface opposite the first inner surface; a second wall defining a second inner surface and a second outer surface opposite the second inner surface, the second wall extending from the first wall; and a third wall defining a third inner surface and a third outer surface opposite the third inner surface. The third wall extends from the first wall and positioned opposite the first wall. The first inner surface, the second inner surface and the third inner surface of the housing define an inner recess to receive a hinge fitting of a flap of a wing. The first outer surface, the second outer surface, the third outer surface of the housing and an inner surface of a wing define a heating chamber. The heating chamber located between the first outer surface of the first wall and the inner surface of the wing to receive heated airflow when the housing is positioned in the wing of the aircraft.

An example system includes a housing interposed between a leading edge of a wing and a flap hinge of a flap of the wing. The housing has a crescent-shaped cross-section to define a heating chamber between leading edge of the wing and a first surface of the housing oriented toward the leading edge. The housing defines a recess oriented toward the flap hinge to receive at least a portion of the flap hinge. The housing fluidly separates the heating chamber and the recess.

Certain examples are shown in the above-identified figures and described in detail below. The features, functions and advantages that have been discussed can be achieved independently in various embodiments or can be combined in yet other embodiments further details of which can be seen with reference to the following description and drawings. The figures are not necessarily to scale and certain features and certain views of the figures may be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

Figure 1:
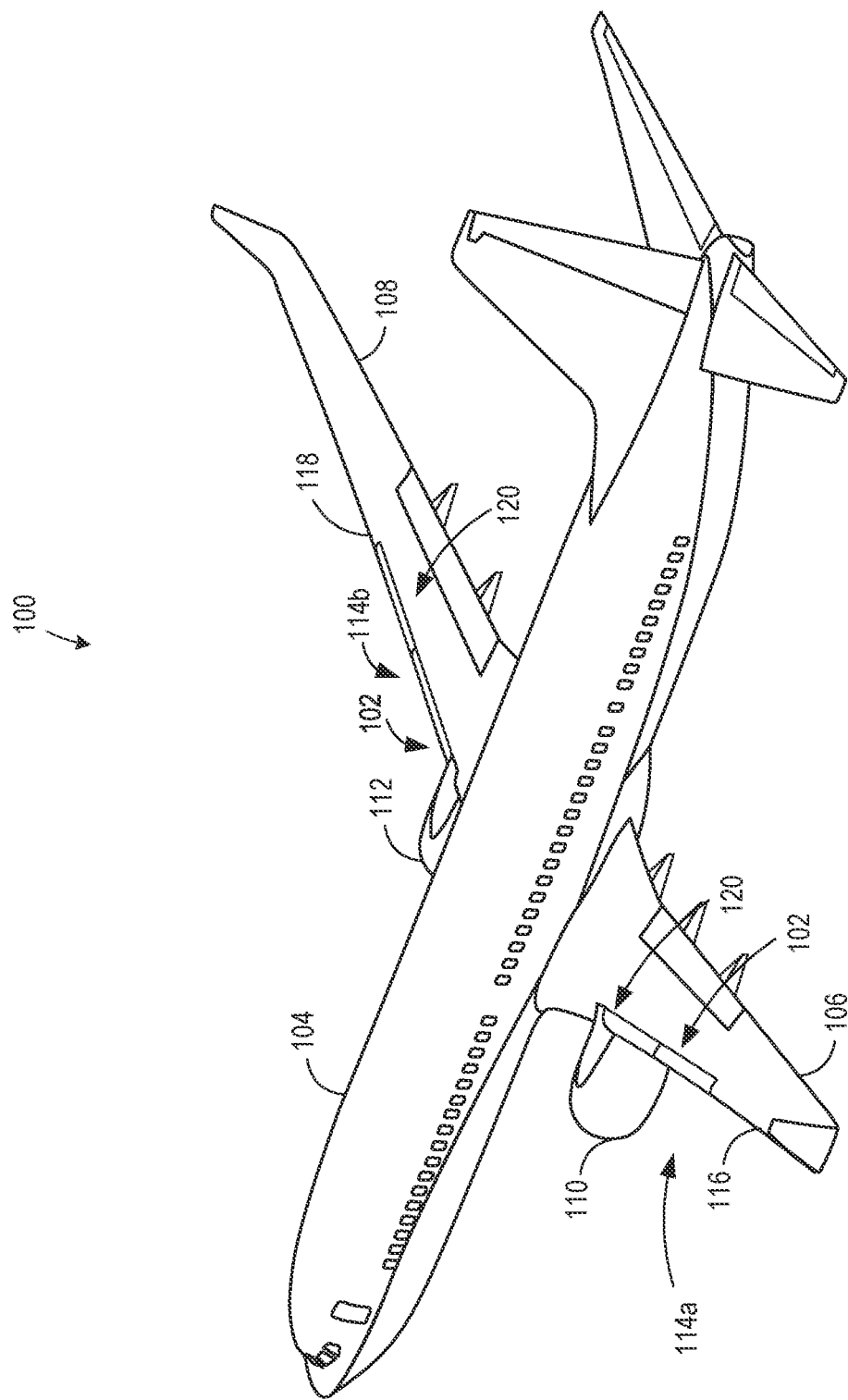
FIG. 1 is an illustration of an example aircraft having an example thermal anti-icing system in accordance with teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Some aircraft employ high-lift systems, such as Krueger flaps, to enhance takeoff performance and/or efficiency. High-lift systems are lift enhancement devices for use with airfoils (e.g., wings) of aircraft. For example, leading edge devices such as, flaps (e.g., Krueger flaps), slats, airfoils having integrated drooped leading edges, etc., are components of high-lift systems. High-lift systems with low drag characteristics are particularly desirable because a lift-to-drag ratio (L/D) is a major determinant of airplane performance. For instance, an increase in L/D results in larger airplane payload, longer range and/or a shorter length runway. For example, for a large twin engine commercial airplane, an increase of 1 percent (%) in L/D during takeoff may enable a 2800 pound (lb.) increase in payload or a 150 nautical mile (nm) increase in range. Additionally, a higher L/D results in lower takeoff thrust requirements, with direct implications to airplane weight, fuel consumption and/or reduced emissions.

While exposing a Krueger flap of a high-lift system to an airflow can result in improved aerodynamics and/or handling of the aircraft at lower speeds (e.g., aircraft speeds of Mach 0.4 or less), the high-lift system can have an undesirable impact on the aerodynamics and/or handling of the aircraft at higher speeds such as, for example, a cruising speed of the aircraft. To avoid such undesirable effects, conventional high-lift systems are movable between a stowed position located at an underside of an airfoil to which a Krueger flap is coupled, and a deployed position in which at least a portion of the Krueger flap is located forward of a leading edge of the airfoil. When the high-lift systems are positioned in a stowed position, the Krueger flap is hidden, retracted, and/or housed within the airfoil to which the high-lift system is coupled. Thus, the Krueger flaps of high-lift systems can be placed into the stowed position during flight operations in which exposure of the Krueger flap to an airflow may have an undesirable impact on the aerodynamics and/or handling of the aircraft (e.g., during a cruise operation of the aircraft). This particular advantage provided by Krueger flaps is not capable of being implemented via alternative lift enhancement devices (e.g., slats, airfoils having integrated drooped leading edges, etc.), as the leading and/or forward edges of such alternative lift enhancement devices are not capable of being moved to a position in which a contour variation formed proximate the leading and/or forward edges of such alternative lift enhancement devices is not exposed to an airflow during flight of the aircraft.

Figure 10:
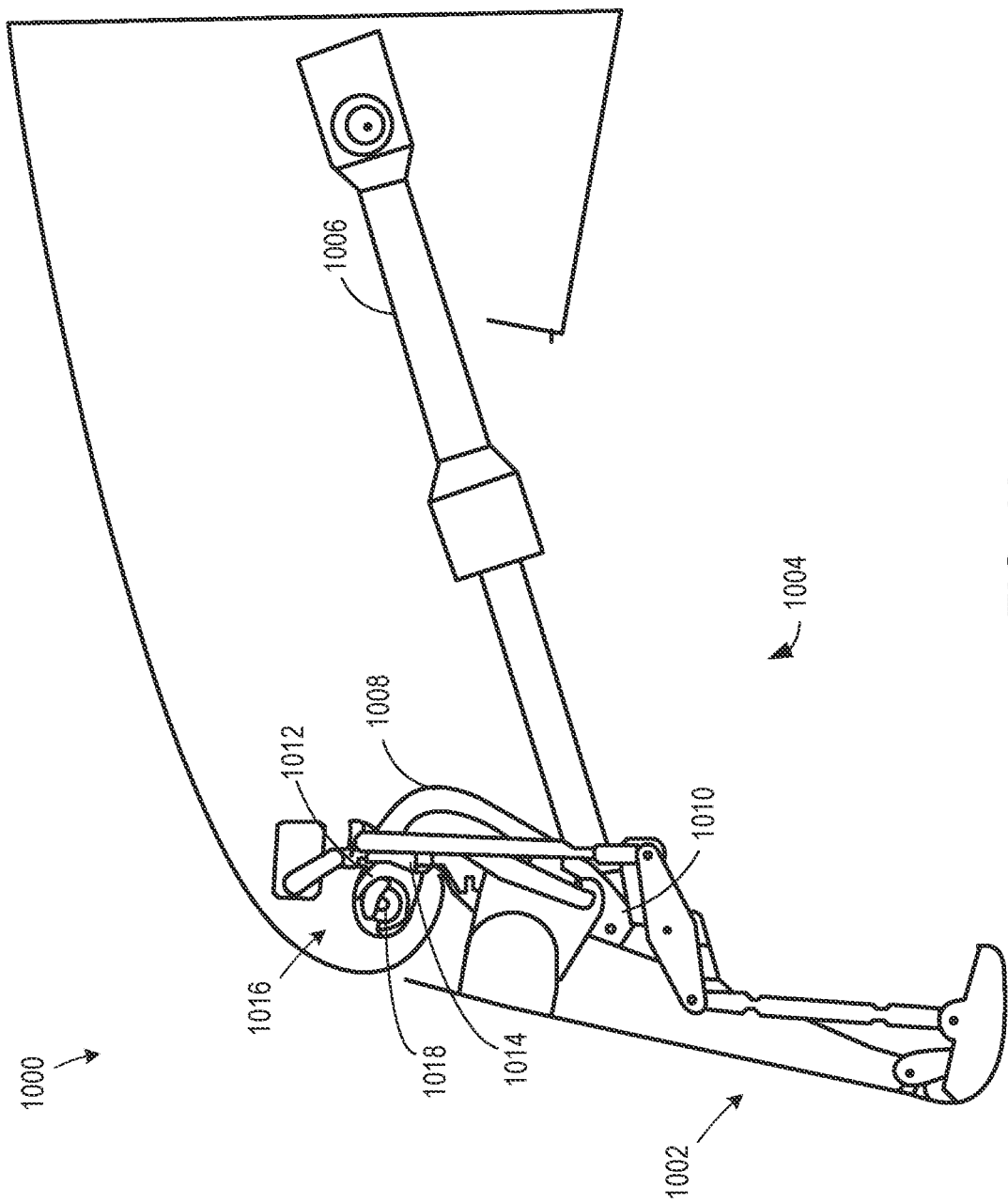
FIG. 10 is a known aircraft wing having an example Krueger flap shown in a deployed position.

For example, FIG. 10 illustrates a known aircraft wing 1000 having a Krueger flap 1002 shown in a deployed position 1004. To move the Krueger flap 1002 to the deployed position 1004, the Krueger flap 1002 includes an actuator 1006. The actuator 1006 moves the Krueger flap 1002 between the deployed position 1004 and a stowed position via a hinge fitting 1008 (e.g., an L-shaped bar). The Krueger flap hinge 1008 has a first end 1010 coupled to the actuator 1006 and a second end 1012 opposite the first end 1010 pivotally coupled to a fixed portion 1014 (e.g., a stringer, a rib, or other non-movable structure) of the aircraft wing 1000 via a pin and clevis connection 1016 that defines a pivot axis 1018 (e.g., a clevis pivot) of the hinge fitting 1008. Thus, the hinge fitting 1008 rotates about the pivot axis 1018 when the Krueger flap 1002 moves between the stowed position and the deployed position 1004.

Additionally, ice accumulation on a leading edge (e.g., a nose) of a wing can reduce wing aerodynamic performance. To avoid ice accumulation, aircraft typically employ thermal anti-icing systems during certain phases of flight. For example, thermal anti-icing systems can be employed during taxiing, takeoff, climb, descent and/or landing. Typically, thermal anti-icing systems can be activated when the aircraft experiences icing conditions (e.g., Liquid Water Content, or LWC, is present) below a threshold altitude (e.g., below 30,000 feet from sea level) and the air temperature is below a threshold temperature (e.g., 50 degrees Fahrenheit). Thus, in some cases, aircraft employ thermal anti-icing systems when holding at altitudes below 30,000 feet and air temperature (e.g., total air temperature) is less than 50° F.

To power thermal anti-icing systems of aircraft, some anti-icing systems employ engine bleed air provided by a compressor of an aircraft engine (e.g., a lower pressure compressor or high-pressure compressor positioned in a core of the engine). The bleed air is often bled from a compressor of the aircraft engine via a dedicated bleed port in a housing of the compressor. However, bleed air temperatures and pressures vary greatly with operating conditions such as, for example, engine speed, operating altitude, environmental conditions (e.g., air temperature, humidity, etc.) and/or during the various phases of flight. Much of the energy consumed by the engine to produce the bleed air can be wasted if not used, thereby increasing fuel burn and reducing engine efficiency.

Figure 11:
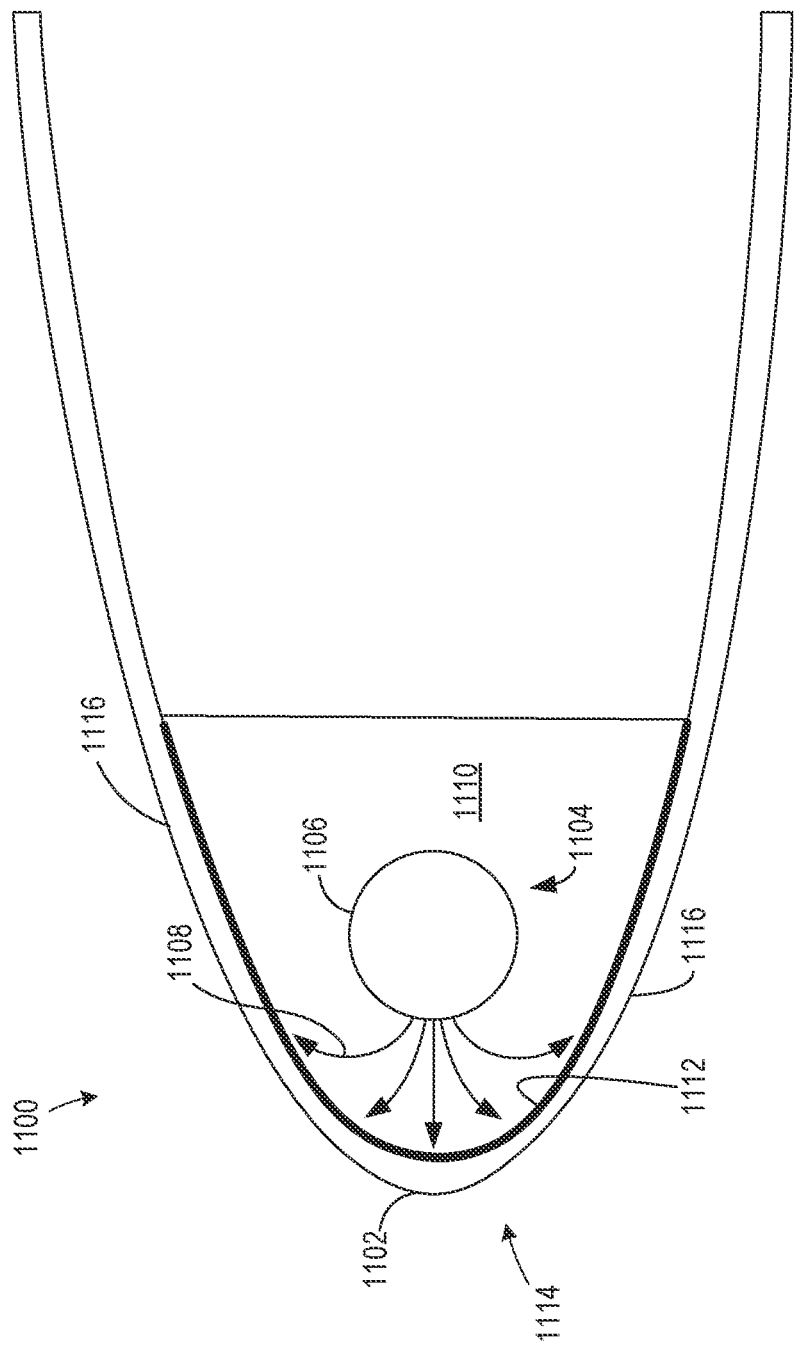
FIG. 11 is a side cross-sectional view of a known aircraft wing having a known thermal anti-icing system.

For example, FIG. 11 is a partial, cross-sectional side view of a known aircraft wing 1100. To prevent ice from forming (e.g., on a leading edge 1102) and/or disrupting the wing performance, a thermal anti-icing system 1104 includes a piccolo tube 1106. The piccolo tube 1106 extends in a spanwise direction adjacent the leading edge 1102 of the aircraft wing 1100. The piccolo tube 1106 receives bleed air from the aircraft engine and provides (e.g., blows) heated bleed air 1108 in to a cavity 1110 to increase a temperature of an inner surface 1112 of the cavity 1110 adjacent the leading edge 1102 to prevent ice formation on the aircraft wing 1100. Additionally, ice formation is prevalent at a nose area 1114 of the leading edge 1102 of the aircraft wing 1100. For example, the leading edge 1102 and/or the nose area 1114 requires heat from the piccolo tube 1106 to prevent ice formation. However, portions 1116 of the aircraft wing 1100 aft of the piccolo tube 1106 may not be susceptible to ice formation. However, due to a structure of the aircraft wing 1100, heating the cavity 1110 with bled air results in heating unnecessary portions of the aircraft wing 1100, which wastes energy and thereby reduces aircraft efficiency and/or performance (e.g., fuel efficiency).

Figure 12:
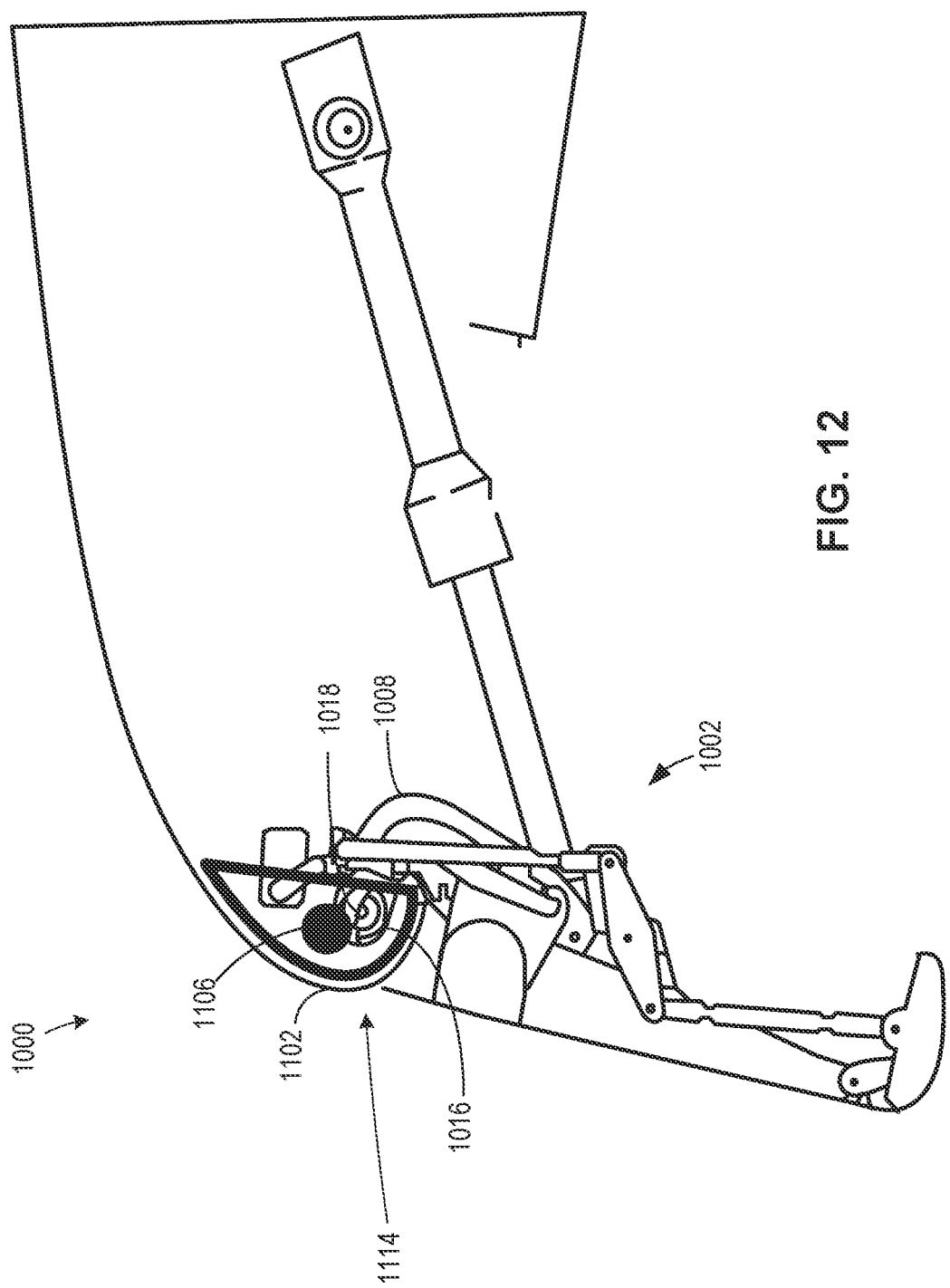
FIG. 12 is a schematic illustration of the thermal anti-icing system of FIG. 11 overlapped with the aircraft wing of FIG. 10.

FIG. 12 is a side, partial cross-sectional view of the piccolo tube 1106 of FIG. 11 overlayed with the aircraft wing 1000 of FIG. 10. As shown in FIG. 12, the piccolo tube 1106 tube overlaps with the hinge fitting 1008 (e.g., the hinge fitting and/or clevis connection). In other words, the piccolo tube 1106, although not coaxially aligned with the pivot axis 1018, interferes with the pin and clevis connection 1016. Reducing a diameter and/or a cross-sectional area of the piccolo tube 1106 and/or moving the piccolo tube 1106 closer to the leading edge 1102 (e.g., the nose area 1114) of the aircraft wing 1000 can result in insufficient heat provided to the aircraft wing 1000. Further, modifying a design of the high-lift system (e.g., the Krueger flap 1002) can result in complex mechanical linkages and/or altering a size of the high-lift system (e.g., the L/D ratio) can effect (e.g., reduce) performance of the high-lift system, thereby reducing an overall efficiency of an aircraft.

In some known systems, thermal anti-icing systems can be implemented with via electrically powered heating elements or generators positioned in the aircraft wing. However, a weight or size of an electric generator capable of producing sufficient heat for an anti-icing system can reduce efficiency for larger aircraft (e.g., commercial aircraft). In some examples, such electrically powered heating elements require cooling systems to cool components of the electrically powered heating elements that generate heat, thereby reducing aircraft efficiency.

Example thermal anti-ice systems disclosed herein enable employment of high-lift systems and thermal anti-icing systems to be provided in a wing of an aircraft without requiring modifying a design (e.g., altering and/or changing a design) and/or a mounting position of either of the thermal anti-icing system and/or the high-lift system. In other words, a piccolo tube can be provided in a wing without interference from a Krueger hinge assembly.

To avoid interference between a Krueger flap assembly and a thermal anti-icing system, thermal anti-icing systems disclosed herein employ a bypass (e.g., a bypass chamber) that enables airflow to flow around a fitting of a high-lift system. In some examples, bypass systems disclosed herein provide a housing structured to fluidly separate (e.g., fluidly isolate) a fitting of a high-lift system and heated airflow (e.g., bleed air) provided to a wing via a thermal anti-icing system. For example, housings disclosed herein have a crescent-shaped cross-section to accommodate components or systems (e.g., hinges, ribs, slats, etc.) within an aircraft structure such as a wing. In some examples, housings disclosed herein reduce a volume of an aircraft wing that is to receive heated airflow, thereby improving efficiency of a thermal anti-icing system disclosed herein. In other words, example housings disclosed herein provide heated air directed solely to a nose of a leading edge of a wing, thereby reducing wasted heat and improving efficiency of an example aircraft (e.g., engine performance and/or reduced fuel consumption). Thus, the thermal anti-icing system disclosed herein is a thermal anti-icing hinge fitting.

Additionally, although some example thermal anti-icing systems disclosed herein are disclosed in connection with Krueger flaps, example thermal anti-icing systems disclosed herein can be employed with any flap, slat, and/or any other hinge connection of an aircraft that requires bypass of fluid around a hinge connection. For example, the thermal anti-icing system disclosed herein can be used with a horizontal stabilizer and/or any other moveable and/or non-moveable edge (e.g., leading edge) sections that receive anti-icing fluid. In some examples, the thermal anti-icing systems disclosed herein can be used with fixed couplings or other joints for which a fluid bypass is needed to avoid spacing conflict or interference between the joint, structure, hinge, etc., and components of the thermal anti-icing system.

FIG. 1 illustrates an aircraft 100 having an example thermal anti-icing system 102 in according with teachings of this disclosure. The aircraft 100 of the illustrated example includes a fuselage 104 that defines a passenger cabin. The aircraft 100 includes a first aircraft wing 106 (e.g., a first airfoil) and a second aircraft wing 108 (e.g., a second airfoil) that extend from the fuselage 104. A first aircraft engine 110 is supported by the first aircraft wing 106, and a second aircraft engine 112 is supported by the second aircraft wing 108. The aircraft 100 of the illustrated example includes an environmental control system that conditions engine bleed air to provide cabin air to the passenger cabin of the fuselage 104. Additionally, the aircraft 100 includes the thermal anti-icing system 102 that uses bleed air (e.g., heated anti-icing air) to remove and/or prevent formation of ice on exterior surfaces of an engine lip and/or leading edges 116, 118 of the aircraft wings 106, 108.

For example, the first aircraft wing 106 includes a first Krueger flap 114a positioned on the first aircraft wing 106 relative to the first aircraft engine 110 and the second aircraft wing 108 includes a second Krueger flap 114b positioned on the second aircraft wing 108 relative to the second aircraft engine 112. The Krueger flaps 114a, 114b are located along the leading edge 116 of the first aircraft wing 106 and the leading edge 118 of the second aircraft wing 108, respectively. While the aircraft 100 of FIG. 1 is illustrated as having a total of two Krueger flaps (the Krueger flaps 114a-b), the aircraft 100 of FIG. 1 may in other examples include additional (e.g., four, six, eight, ten, twelve, etc.) or fewer (e.g., one) Krueger flap. In some examples, the location(s), size(s), and/or shape(s) of respective ones of the Krueger flaps 114a-b of the aircraft 100 may differ relative to the location(s), size(s) and/or shape(s) of the Krueger flaps 114a-b shown in FIG. 1. The Krueger flaps 114a-b of the illustrated example are shown in a stowed position 120. When the Krueger flaps 114a-b are stowed, leading portions of the Krueger flaps 114a-b are typically hidden, retracted, and/or housed within the undersides of first aircraft wing 106 and the second aircraft wing 108. The Krueger flaps 114a-b alter a shape of an airfoil provided by the first aircraft wing 106 and the second aircraft wing 108 to produce additional aerodynamic lift. As described in greater detail below, each of the aircraft wings 106 and 108 includes components of the thermal anti-icing system 102 to provide anti-icing fluid to the leading edges 116, 118 of the first aircraft wing 106 and the second aircraft wing 108, respectively.

While the aircraft 100 of FIG. 1 is illustrated as a commercial aircraft, the thermal anti-icing system 102 disclosed herein can be implemented with other types of aircraft. For example, the thermal anti-icing system 102 can be implemented with vertical takeoff and landing aircraft, military aircraft, any other type of aircraft, and/or any other vehicle or aerodynamic surface(s). Additionally, while the thermal anti-icing system 102 is described with a Krueger flap, the thermal anti-icing system 102 can be used with a horizontal stabilizer and/or any other moveable and/or non-moveable edge (e.g., leading edge) sections that receive anti-icing fluid.

Figure 2A:
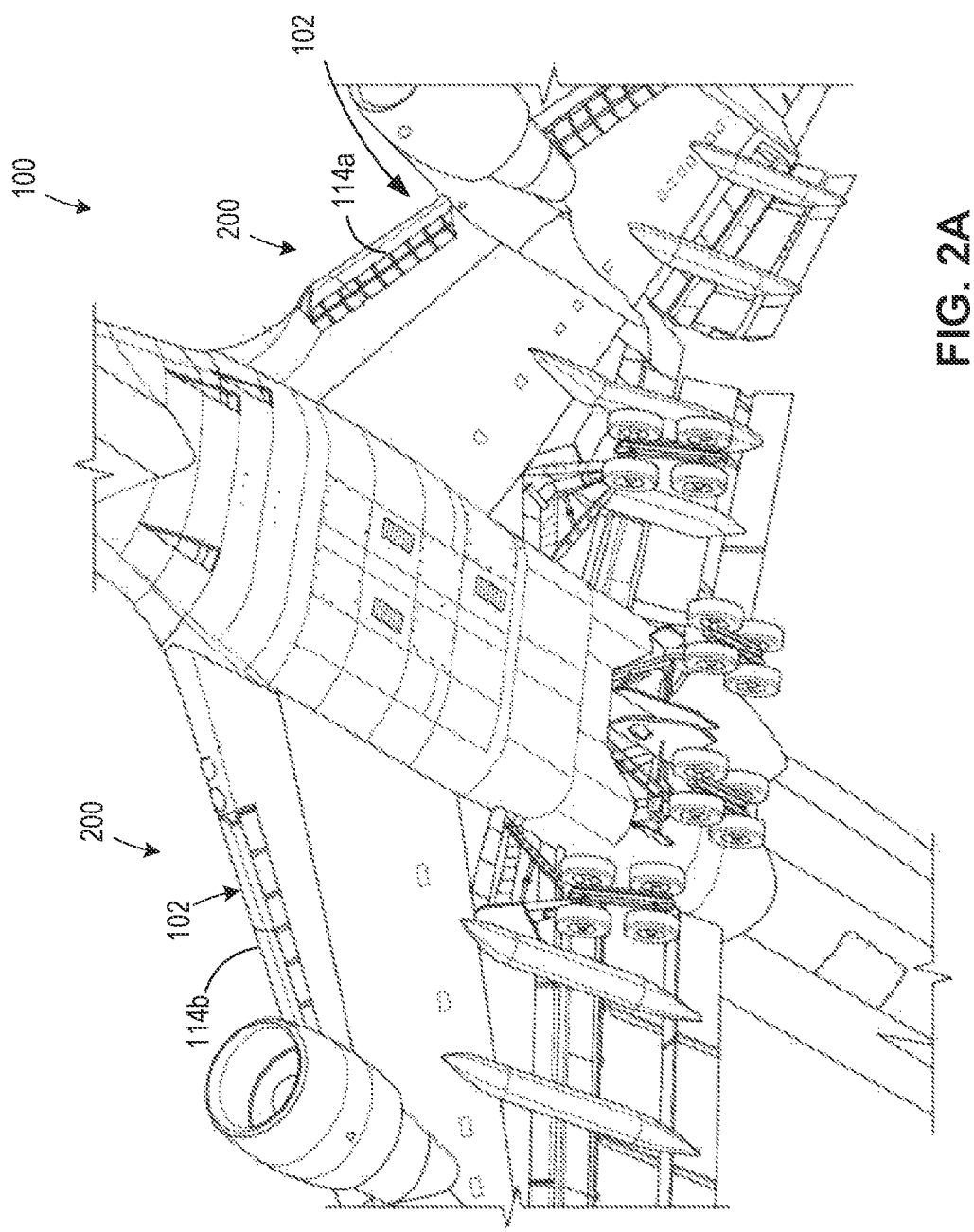
FIG. 2A is a partial, perspective view of the example aircraft of FIG. 1 showing an example flap in an example deployed position.

FIG. 2A is a bottom, perspective view of the aircraft 100 of FIG. 1 showing the Krueger flaps 114a-b in a deployed position 200. In the deployed position 200, the Krueger flaps 114a-b extend in a spanwise direction along the first aircraft wing 106 and the second aircraft wing 108 to which the Krueger flaps 114a-b are coupled. The Krueger flaps 114a-b are located forward of the leading edge 116 of the first aircraft wing 106 and the leading edge 118 of the second aircraft wing 108 when the Krueger flaps 102a-b are fully deployed. Each of the Krueger flaps 114a-b includes a plurality of hinges to pivotally couple the Krueger flaps 114a-b to the respective aircraft wings 106 and 108.

Figure 2B:
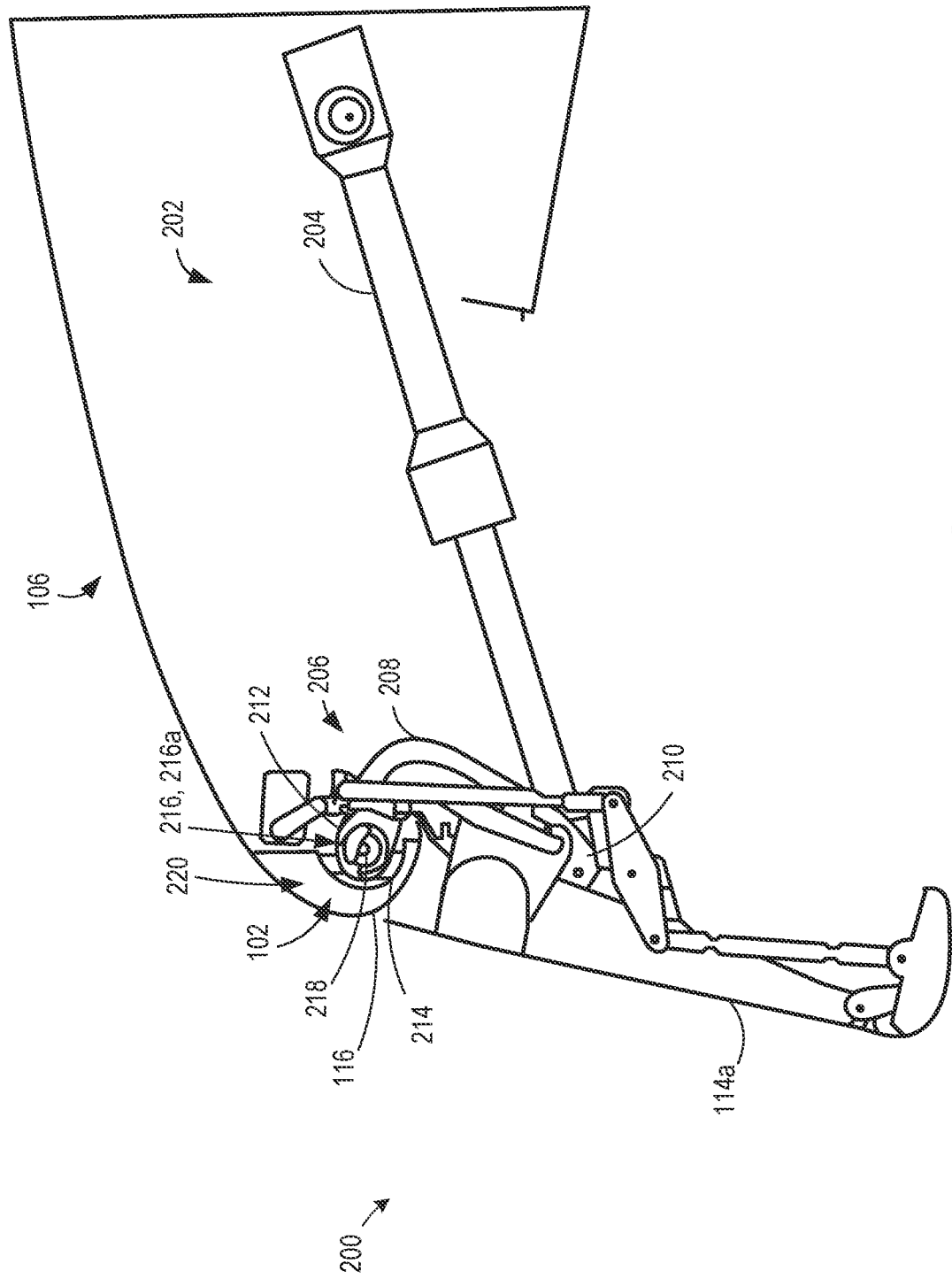
FIG. 2B is a cross-sectional side view of an aircraft wing and the example flap of FIG. 2A.

FIG. 2B is a cross-sectional side view of the first Krueger flap 114a of FIG. 2A shown in the deployed position 200 and showing the thermal anti-icing system 102 disclosed herein. The aircraft wing 106 includes the thermal anti-icing system 102 in accordance with the teachings of this disclosure. For brevity, only the first aircraft wing 106 is described. However, the second aircraft wing 108 of the aircraft 100 of FIG. 1 is similar (e.g., mirror image) to the first aircraft wing 106 and employs the thermal anti-icing system 102 disclosed herein.

To deploy and stow the Krueger flap 114a, the Krueger flap 114a of the illustrated example includes an actuation system 202. The actuation system 202 includes an actuator 204 operatively coupled to the Krueger flap via a hinge assembly 206. The hinge assembly 206 of the illustrated example includes a hinge fitting 208 (e.g., a hinge fitting, an L-shaped bar). The hinge fitting 208 has a first end 210 coupled to the actuator 204 and a second end 212 opposite the first end 210 pivotally coupled to a fixed portion 214 of the aircraft wing 106 via a connector 216. In the illustrated example, the connector 216 is a clevis connection that defines a pivot axis 218 (e.g., a clevis pivot) of the hinge fitting 208. Thus, the hinge fitting 208 rotates about the pivot axis 218 when the Krueger flap 114a moves between the stowed position 120 (FIG. 1) and the deployed position 200. As described in greater detail, the thermal anti-icing system 102 of the illustrated example defines a portion of the connector 216.

The thermal anti-icing system 102 is provided adjacent the hinge assembly 206. In particular, the thermal anti-icing system 102 is positioned between the hinge fitting 208 (e.g., the second end 212 of the hinge fitting 208) and the leading edge 116 of the aircraft wing 106. Specifically, the thermal anti-icing system 102 of the illustrated example provides a bypass (e.g., adjacent the hinge fitting 208) to avoid thermal anti-icing components (e.g., piccolo tubes) from interfering with the hinge fitting 208, the hinge assembly 206 and/or the actuation system 202 of the Krueger flap 114a. In the illustrated example, the Krueger flap 114a includes a plurality of hinge points (e.g., hinge assemblies) spaced apart along a spanwise direction of the aircraft wing 106. The thermal anti-icing system 102 disclosed herein provides a fluid bypass 220 at each hinge assembly to avoid spacing conflict between each hinge assembly 206 and the thermal anti-icing system 102. In other words, the fluid bypass 220 enables heated air to flow past the hinge assembly 206 without affecting a position or location of the hinge assembly 206 of the Krueger flap 114a relative to the aircraft wing 106. Additionally, the fluid bypass 220 provided by the thermal anti-icing system 102 does not decrease performance of the thermal anti-icing system 102. For example, the fluid bypass 220 provided by the thermal anti-icing system 102 does not prevent or reduce heated airflow to the leading edge 116 of the aircraft wing 106 adjacent the fluid bypass 220.

Figure 3A:
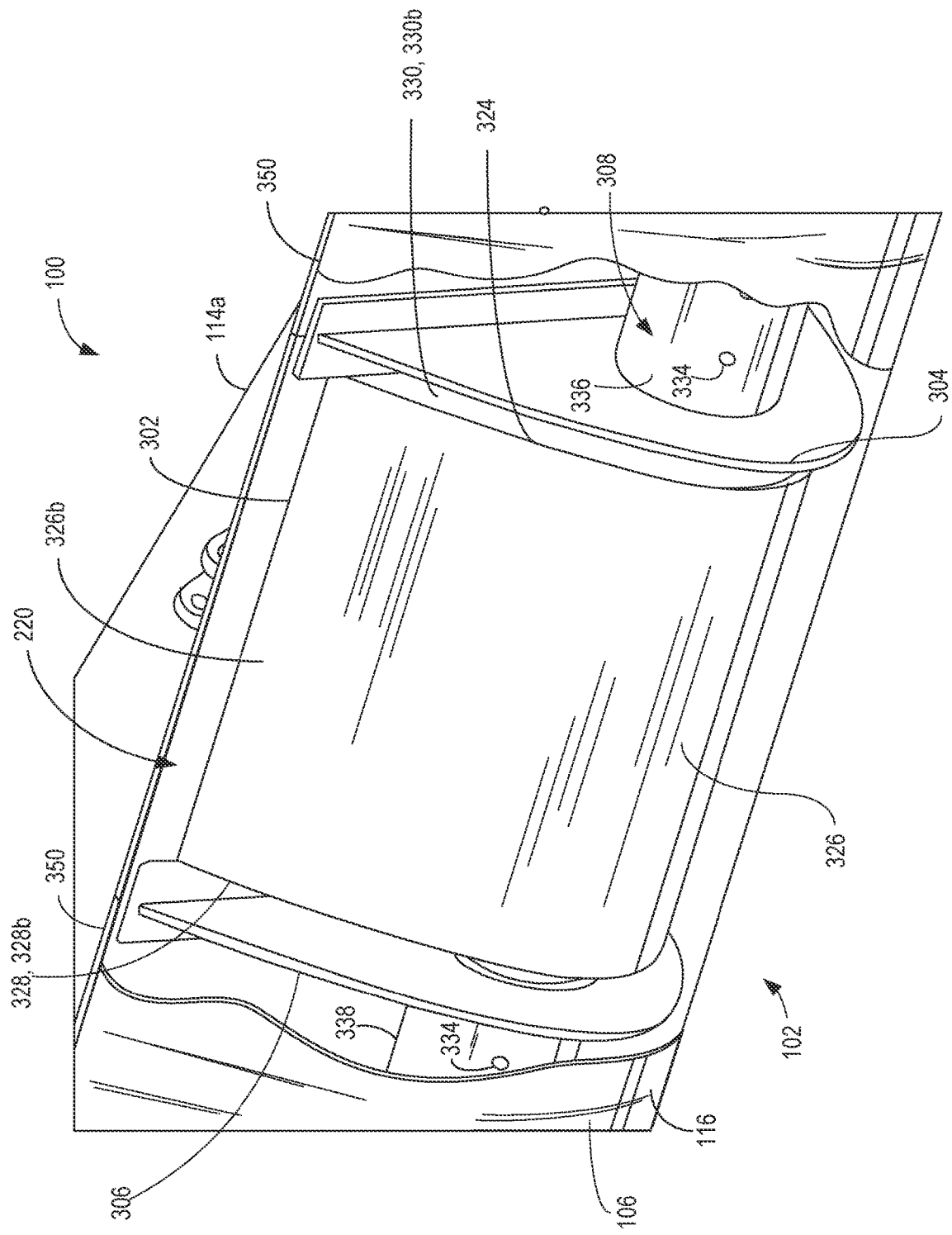
FIG. 3A is a partial, perspective, cutaway front view of the example thermal anti-icing system disclosed herein.
Figure 3B:
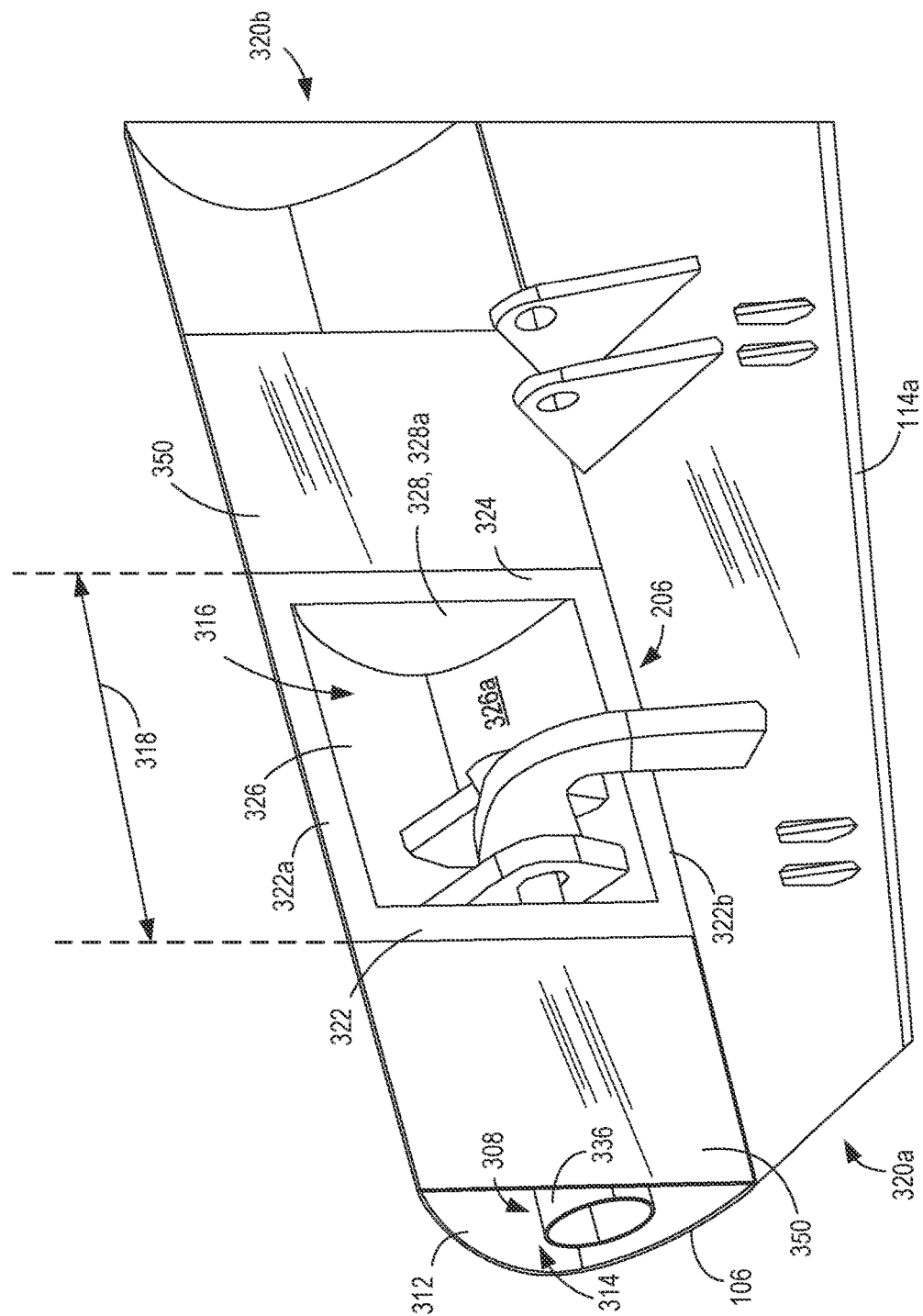
FIG. 3B is a partial, perspective rear view of the example thermal anti-icing system of FIG. 3A.
Figure 3C:
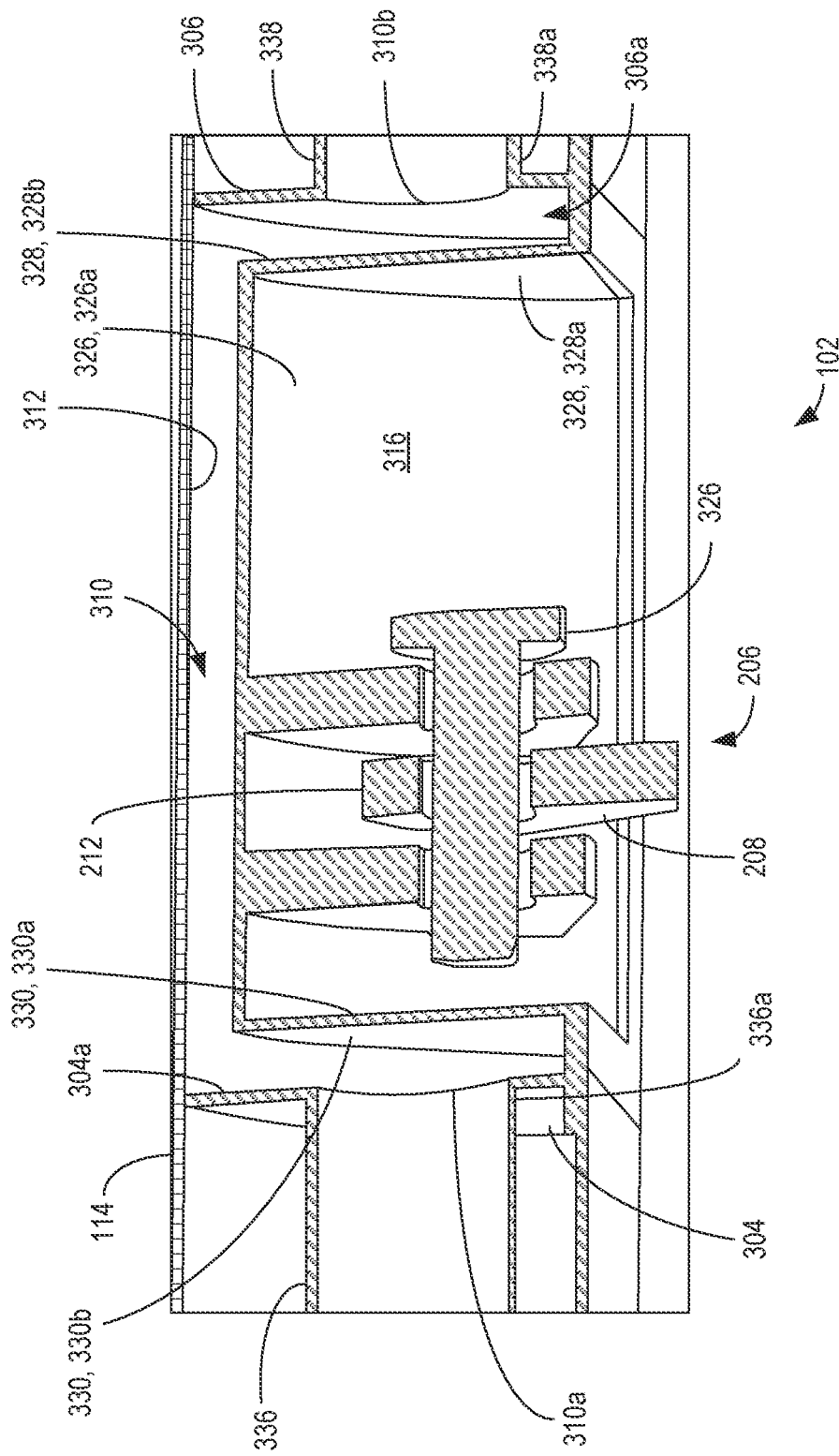
FIG. 3C is a partial, rear cross-sectional perspective view of the thermal anti-icing system of FIGS. 3A and 3B.

FIG. 3A is a partial, front perspective view of the aircraft wing 106 of FIGS. 1 and 2. FIG. 3B is a partial, rear perspective view of the aircraft wing 106 of FIG. 3A. FIG. 3C is a partial, cross-sectional perspective view of the thermal anti-icing system 102 of FIGS. 1, 2, 3A and 3B. The aircraft wing 106 of FIG. 3A is a cutaway view to show the thermal anti-icing system 102 positioned inside the aircraft wing 106.

Referring to FIGS. 3A-3C, the thermal anti-icing system 102 of the illustrated example includes a housing 302 (e.g. a shroud). Additionally, the thermal anti-icing system 102 of the illustrated example includes a first support fitting 304 (e.g., a first baffle), a second support fitting 306 (e.g., a second baffle) and a piccolo system 308. The housing 302 is interposed between the leading edge 116 of the aircraft wing 106 and the hinge assembly 206 (e.g., a goose neck fitting) of the Krueger flap 114a. As described in detail below, the housing 302 and the leading edge 116 of the aircraft wing 106 define (e.g., at least a portion of) a heating chamber 310 between the housing 302 and the leading edge 116 (e.g., an inner surface 312) (FIG. 3B) of the aircraft wing 106 to receive heated airflow (e.g., to provide the fluid bypass 220) when the housing 302 is positioned within a cavity 314 (FIG. 3B) of the aircraft wing 106. Additionally, the housing 302 defines an inner recess 316 (e.g., an inner cavity, a chamber, etc.) (FIG. 3B). The inner recess 316 is formed opposite the heating chamber 310. The inner recess 316 of the housing 302 of the illustrated example receives and/or supports the hinge assembly 206 of the first Krueger flap 114a of the aircraft wing 106. Thus, the housing 302 does not interfere with the Krueger flap 114a and does not require redesigning or reconfiguring the actuation system 202 of the Krueger flap 114a. In other words, the housing 302 and/or the fluid bypass 220, via the heating chamber 310, enables heated air to flow through the heating chamber 310 without affecting a position or location of the hinge assembly 206 of the Krueger flap 114a relative to the aircraft wing 106 and/or without impeding an operation of the Krueger flap 114a. Additionally, the housing 302 fluidly isolates or separates the heating chamber 310 and the inner recess 316.

The housing 302 has a length 318 in a spanwise direction between an outboard end 320a and an inboard end 320b of the aircraft wing 106. The housing 302 of the illustrated example includes a flange 322 (e.g., a lip) and a body 324 protruding from the flange 322. The inner recess 316 of the illustrated example is oriented toward a rear of the aircraft wing 106 (e.g., in an aft direction or in a direction away from the leading edge 114 of the aircraft wing 106). Specifically, the body 324 defines a first wall 326 (e.g., an outer or front wall), a second wall 328 (e.g., a first side wall), and a third wall 330 (e.g., a second side wall) (e.g., FIG. 3C) positioned opposite the second wall 328. The second wall 328 extends between the first wall 326 and the flange 322 (e.g., in a direction between the leading edge 116 and a trailing edge of the aircraft wing 106). The third wall 330 is opposite the second wall 328 and extends between the first wall 326 and the flange 322 (e.g., in a direction between the leading edge 116 and a trailing edge of the aircraft wing 106). The housing 302 of the illustrated example has a crescent, cross-sectional shape. Thus, the first wall 326 protrudes in an arcuate profile. In the illustrated example, the arcuate profile of the first wall 326 is similar (e.g., complementary or identical) to an arcuate profile or shape of the leading edge 114 of the aircraft wing 106. In other words, first edges (e.g., upper edges) of the first wall 326, the second wall 328, and the third wall 330, respectively, converge or couple to an upper flange portion 322a of the flange 322. Likewise, second edges (e.g., lower edges) of the first wall 326, the second wall 328 and the third wall 330, respectively, converge or couple to a lower flange portion 322b of the flange 322.

The first wall 326 of the illustrated example defines a first inner surface 326a and a first outer surface 326b opposite the first inner surface 326a. The second wall 328 defines a second inner surface 328a and a second outer surface 328b opposite the second inner surface 328a. The third wall 330 defines a third inner surface 330a and a third outer surface 330b opposite the third inner surface 330a. Specifically, the first outer surface 326b, the second outer surface 328b and the third outer surface 330b of the housing 302 (along with the inner surface 312 of the aircraft wing 106) define at least a portion of the heating chamber 310 to receive heated airflow. The first inner surface 326a, the second inner surface 328a and the third inner surface 330a define the inner recess 316. In other words, the first wall 326 is positioned between the heating chamber 310 and the inner recess 316. To this end, the inner recess 316 does not define the heating chamber 310. In other words, the inner recess 316 is fluidly separated and/or fluidly isolated from the heating chamber 310.

To duct or channel heated bleed air from the aircraft engine 110 (FIG. 1) to the aircraft wing 106, the thermal anti-icing system 102 of the illustrated example includes the piccolo system 308. For instance, piccolo system 308 channels heated bleed air to the inner surface 312 of the leading edge 114 of the aircraft wing 106. Thus, the piccolo system 308 of the illustrated example extends in a spanwise direction across the wing (e.g., between a wing tip and a wing box of the aircraft 100). The piccolo system 308 of the illustrated example includes openings 334 (e.g., jets) to direct heated air towards the inner surface 312 of the leading edge 116. The piccolo system 308 of the illustrated example includes a first piccolo tube 336 and a second piccolo tube 338. The first piccolo tube 336 of the illustrated example provides heated airflow from a heat source (e.g., bleed air from the aircraft engine 110) to the heating chamber 310 and the second piccolo tube 338 of the illustrated example provides heated airflow from the heating chamber 310 to portions of the aircraft wing 106 downstream from the housing 302.

To support the first and second piccolo tubes 336, 338, the thermal anti-icing system 102 of the illustrated example includes the first support fitting 304 (e.g., a first baffle) and the second support fitting 306 (e.g., a second baffle). The first support fitting 304 is spaced away from the second support fitting 306. For example, the housing 302 is positioned between the first support fitting 304 and the second support fitting 306. In the illustrated example, the first support fitting 304 is positioned upstream from the housing 302 and the second support fitting 306 is positioned downstream from the housing 302. The first support fitting 304 receives or supports (e.g., an end 336a of) the first piccolo tube 336 at an inlet 310a of the heating chamber 310 and second support fitting 306 receives or supports (e.g., an end 338a of) the second piccolo tube 338 at an outlet 310b of the heating chamber 310. Thus, in the illustrated example, the first support fitting 304 provides or defines the inlet 310a of the heating chamber 310 and the second support fitting 306 defines or provides the outlet 310b of the heating chamber 310. Additionally, the first support fitting 304 and the second support fitting 306 define a portion of the heating chamber 310. For example, a fourth inner surface 304a of the first support fitting 304 and a fifth inner surface 306a of the second support fitting 306 are oriented towards each other and the heating chamber 310 and, therefore, define a portion of the heating chamber 310. Thus, when the thermal anti-icing system 102 is positioned in the cavity 314 of the aircraft wing 106, the fourth inner surface 304a of the first support fitting 304, the fifth inner surface 306a of the second support fitting 306, the first outer surface 326b of the first wall 326, the second outer surface 328b of the second wall 328, the third outer surface 330b of the third wall 330, and the inner surface 312 of the aircraft wing 106 (e.g., the portion of the inner surface 312 between the first support fitting 304 and the second support fitting 306) define the heating chamber 310. In some examples, the first support fitting 304 is integrally formed with the housing 302 and/or the end 336a of the first piccolo tube 336 and/or the second support fitting 306 is integrally formed with the housing 302 and/or the end 338a of the second piccolo tube 338 as a unitary or single structure.

A plurality of covers 350 enclose the cavity 314 of the leading edge 116 of the aircraft wing 106. For example, the covers 350, in combination with the housing 302, enclose the cavity 314 of the aircraft wing 106. For example, the covers 350 are positioned adjacent the housing 302. In this manner, the housing 302 and the covers 350 enclose the cavity 314 to reduce a volume of the leading edge 116 that receives heating fluid, which increases an efficiency of the thermal anti-icing system 102 by reducing wasted heat. The covers 350 are positioned along a spanwise direction of the aircraft wing 106 at portions not covered by the housing 302. In some examples, the covers 350 are flush mounted with the flange 322 of the housing 302. In some examples, the covers 350 can be offset (e.g., recessed or protruding) relative to the flange 322 of the housing 302.

Figure 4:
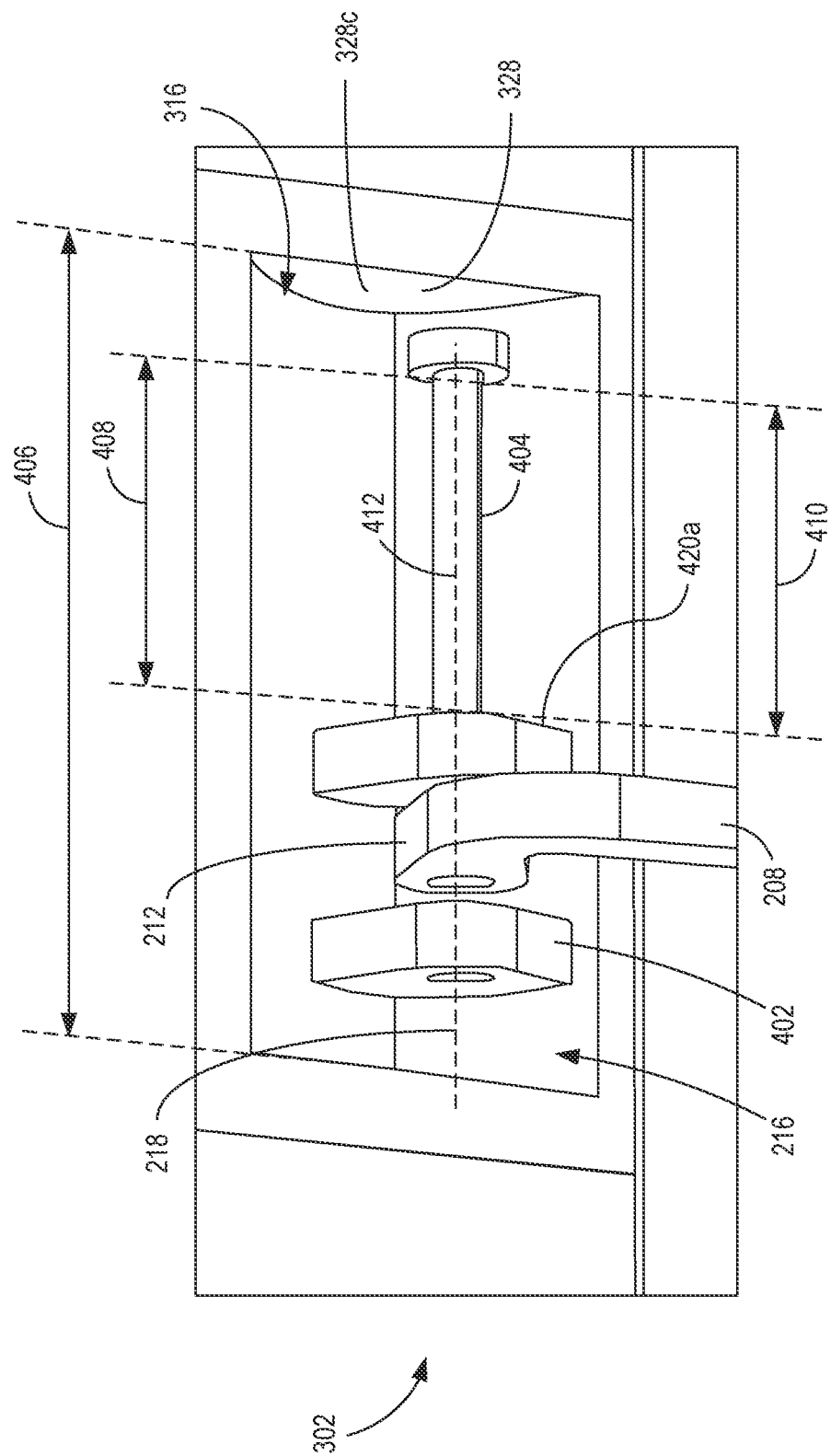
FIG. 4 is a partial, rear view of the example thermal anti-icing system of FIGS. 3A-3C shown in a partially assembled state.

FIG. 4 is a perspective, partial rear view of the example housing 302 of FIGS. 3A, 3B and 3C. In the illustrated example, the housing 302 of the illustrated example forms part of the hinge assembly 206 of FIG. 2B. Specifically, the housing 302 provides and/or defines the pivot axis 218 about which the Krueger flap 114a rotates between the stowed position 120 (FIG. 1) and the deployed position 200 (FIG. 2B). The inner recess 316 receives or supports the second end 212 of the hinge fitting 208 of the Krueger flap 114a. To provide the pivot axis 218, the hinge assembly 206 of the actuation system 202 (FIG. 2B) of the illustrated example employs the connector 216. The connector 216 of the illustrated example includes a clevis 402 and a pin 404. The clevis 402 and the pin 404 couple to the second end 212 of the hinge fitting 208. The clevis 402 is positioned in the inner recess 316. The clevis 402 of the illustrated example receives the second end 212 of the hinge fitting 208. The pin 404 pivotally couples the clevis 402 and the second end 212 of the hinge fitting 208. In the illustrated example, the clevis 402 is coupled to the housing 302 and accessible via the inner recess 316. In some examples, the clevis 402 can be welded to the housing 302. In some examples, the clevis 402 can be integrally formed with the housing 302.

To enable the pin 404 to slide in the inner recess 316 between a first position (e.g., an assembled position shown in FIG. 3C) and a second position (e.g., an uncoupled position shown in FIG. 4), the inner recess 316 is formed with a length 406 that is greater than a length 408 of the pin 404. Specifically, the length 408 of the pin 404 is less than a length 410 between a first side or edge 402a of the clevis 402 (e.g., a tang or side of the clevis 402 closest to the second wall 328) and the second inner surface 328a of the second wall 328 in a direction along a longitudinal axis 412 of the pin 404. For example, the pin 404 can be positioned in the inner recess 316 without interference from the second wall 328 when coupling the pin 404 and the clevis 402 during an assembly process. Thus, the length 406 of the inner recess 316 of the housing 302 in a spanwise direction enables the pin 404 of the connector 216 of the hinge assembly 206 to be positioned between a fully inserted position relative to the clevis 402 to couple the hinge fitting 208 and the clevis 402 (e.g., as shown in FIG. 3C), and a fully removed position relative to the clevis 402 to enable the hinge fitting 208 to be removed from the clevis 402 (e.g., as shown in FIG. 4).

Figure 5:
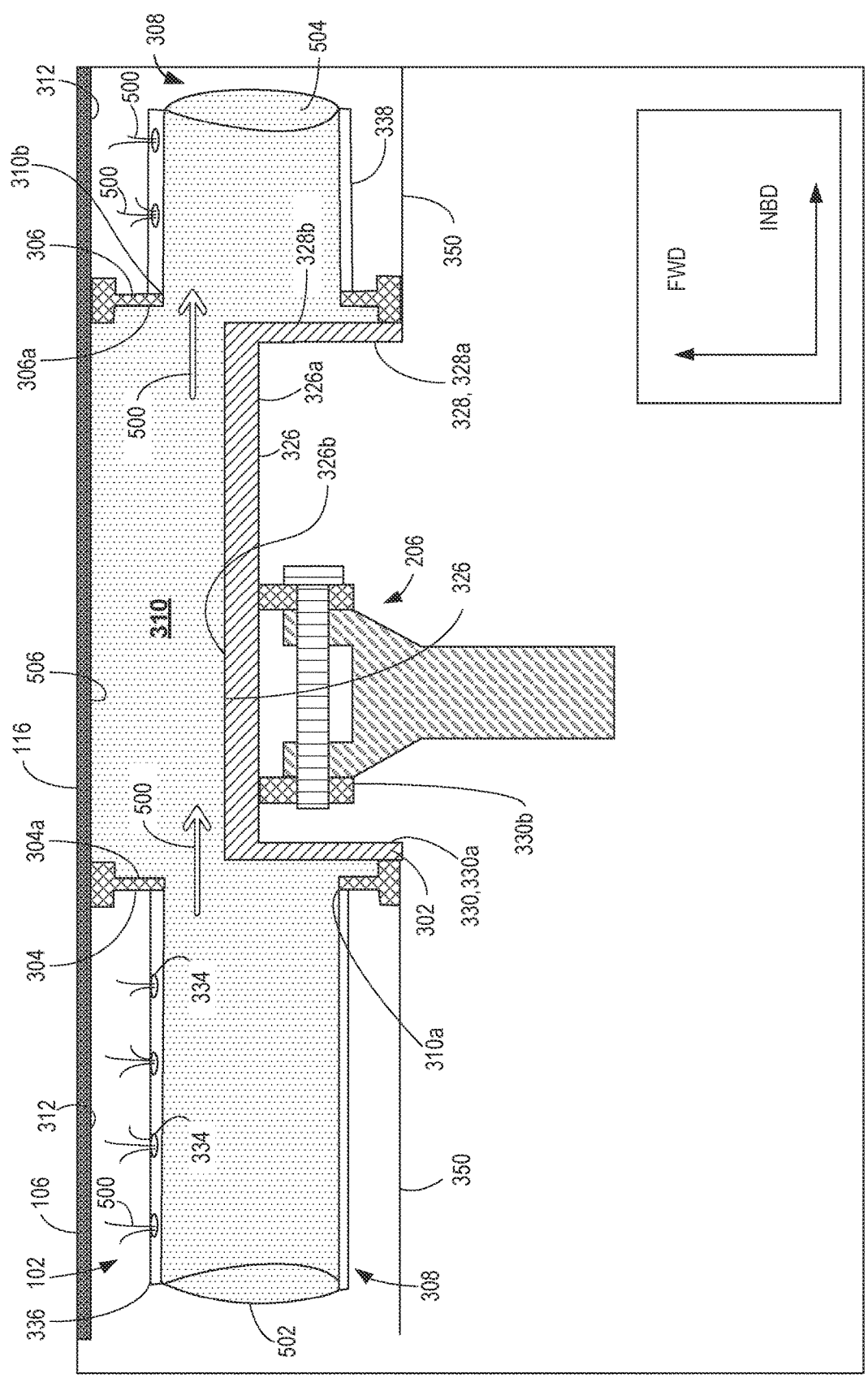
FIG. 5 is a top cross-sectional of the example anti-icing system of FIGS. 3A-3C.

FIG. 5 is a cross-sectional, top view of the example thermal anti-icing system of FIGS. 3A-3C and 4. In operation, bleed air 500 is carried from an upstream source (e.g., the aircraft engine 110) to the aircraft wing 106 via the piccolo system 308. In some examples, the first piccolo tube 336 carries the bleed air 500 to a second housing (e.g., another housing identical to the housing 302) upstream from the housing 302 that is associated with another hinge assembly 206 of the Krueger flap 114a.

The bleed air 500 of the illustrated example is pressurized when it flows through the piccolo system 308 from an upstream source (e.g., the aircraft engine 110). A pressure differential between the upstream source or a first end 502 of the piccolo system 308 and a downstream source or second end 504 of the piccolo system 308 causes the bleed air 500 to flow from the first piccolo tube 336, through the heating chamber 310, and to the second piccolo tube 338. As the bleed air 500 flows through the first piccolo tube 336 upstream from the heating chamber 310, the bleed air 500 is directed toward the inner surface 312 of the leading edge 116 via the openings 334. In other words, the openings 334 are oriented toward the leading edge 116 to heat the inner surface 312 of the leading edge 116 upstream from (e.g., outside of) the heating chamber 310. In addition to the bleed air 500 exiting the openings 334 of the first piccolo tube 336, the first piccolo tube 336 carries the bleed air 500 to the heating chamber 310 via the inlet 310a. The bleed air 500 exits the heating chamber 310 via the outlet 310b. The second piccolo tube 338 carries the bleed air 500 from the outlet 310b and downstream from the heating chamber 310. As the bleed air 500 flows through the second piccolo tube 338 downstream from the heating chamber 310, the bleed air 500 is directed toward inner surface 312 of the leading edge 116 via the openings 334. In other words, the openings 334 of the second piccolo tube 338 are oriented toward the leading edge 116 to heat the inner surface 312 of the leading edge 116 downstream from (e.g., outside of) the heating chamber 310. In some examples, the second piccolo tube 338 carries the bleed air 500 to a second housing (e.g., another housing identical to the housing 302) downstream from the housing 302 that is associated with another hinge assembly 206 of the Krueger flap 114a. In other words, in some examples, the thermal anti-icing system 102 of the illustrated example can include a plurality of spaced apart housings and/or heating chambers fluidly coupled (e.g., in series) along a spanwise direction of the aircraft wing 106 via piccolo tubes.

Thus, the housing 302 and/or the heating chamber 310 provides a bypass for the bleed air 500 to flow around the hinge assembly 206 of the Krueger flap 114a. As noted above, the heating chamber 310 of the illustrated example is defined by the first outer surface 326b of the first wall 326, the second outer surface 328b of the second wall 328, the third outer surface 330b of the third wall 330, the fourth inner surface 304a of the first support fitting 304, the fifth inner surface 306a of the second support fitting 306 and a portion 506 of the inner surface 312 of the leading edge 116 of the aircraft wing 106 positioned between the first support fitting 304 and the second support fitting 306. Thus, although the housing 302 provides a bypass fluid flow pathway for the bleed air 500 to flow around the hinge assembly 206, the portion 506 of the inner surface 312 of the leading edge 116 is provided with heat via the bleed air 500 during an anti-icing operation. Additionally, the portions of the inner surface 312 upstream and downstream from the heating chamber 310 are heated by the bleed air 500 flowing through the openings 334. Thus, the bypass flow path provided by the heating chamber 310 does not affect or reduce an efficiency of the thermal anti-icing system 102.

Additionally, the bleed air 500 of the illustrated example does not flow to the inner recess 316 of the housing 302. For example, the cover 350 maintains the bleed air 500 within the cavity 314 of the leading edge 116 of the aircraft wing 106. In other words, the inner recess 316 is fluidly sealed or isolated from the bleed air 500. In some examples, the thermal anti-icing system 102 can include one or more seals (e.g., a rubber gasket, a sealing liquid or gel, etc.) between the inner surface 312 and the first and second support fittings 304, 306. In some examples, the thermal anti-icing system 102 can include one or more seals (e.g., a rubber gasket, a sealing liquid or gel, etc.) between the housing 302 and the first and second support fittings 304, 306.

Figure 6A:
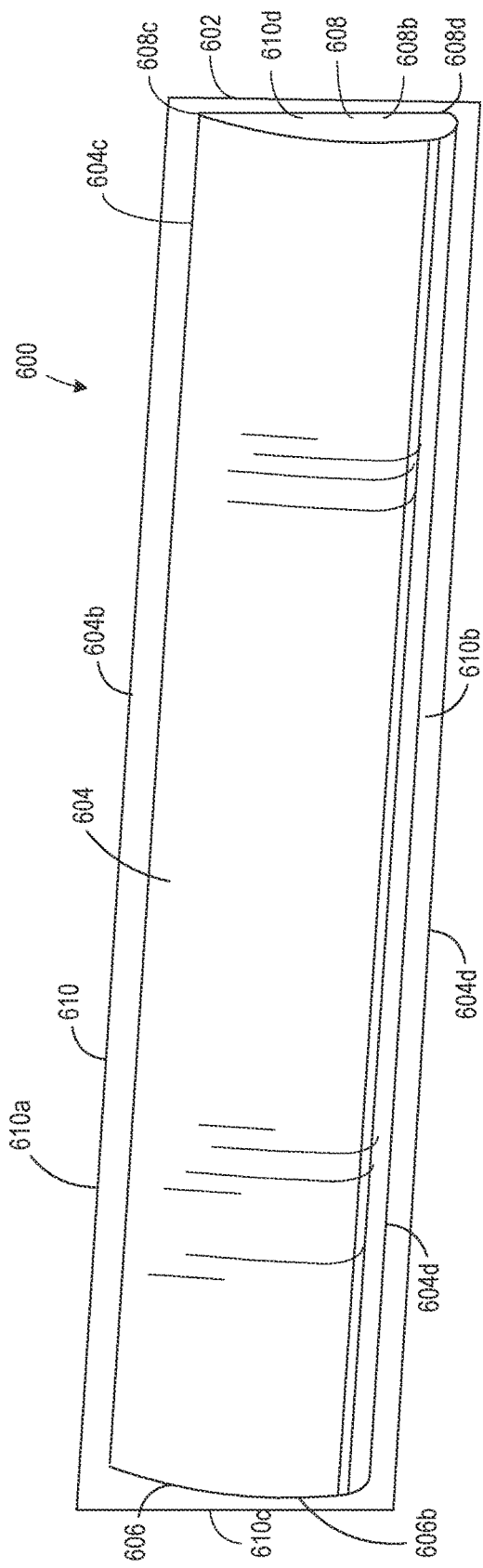
FIG. 6A is a partial, perspective front view of another example thermal anti-icing system disclosed herein.
Figure 6B:
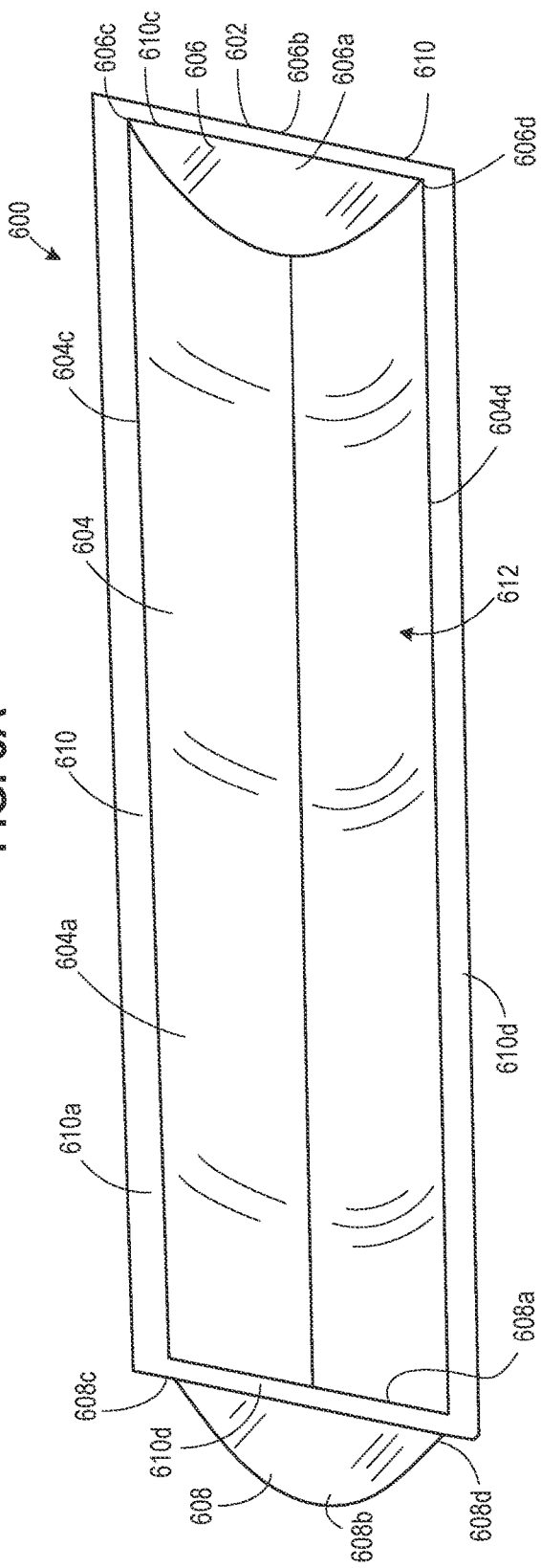
FIG. 6B is a partial, perspective rear view of the example thermal anti-icing system of FIG. 6A.

FIG. 6A is a perspective, front view of another example thermal anti-icing system 600 disclosed herein. FIG. 6B is a perspective, rear view of the example thermal anti-icing system 600 of FIG. 6A. The thermal anti-icing system 600 of the illustrated example can be used with the aircraft 100 of the FIG. 1 or any other aircraft. In contrast to the thermal anti-icing system 102 of FIGS. 3A-3C, 4 and 5, the thermal anti-icing system 600 of the illustrated example does not include a piccolo system (e.g., the piccolo system 308) and support fittings (e.g., the first and second support fittings 304, 306).

The thermal anti-icing system 600 of the illustrated example includes a housing 602 (e.g., a shroud). The housing 602 includes a first wall 604, a second wall 606 and a third wall 608 opposite the first wall 604. The first wall 604 defines a first inner surface 604a and a first outer surface 604b opposite the first inner surface 604a. The second wall 606 defines a second inner surface 606a and a second outer surface 606b opposite the second inner surface 606a. The third wall 608 defines a third inner surface 608a and a third outer surface 608b opposite the third inner surface 608a. The second wall 606 is positioned opposite the third wall 608. The housing 602 includes a flange 610 (e.g., a rectangular shaped flange 610). The second wall 606 and the third wall 608 extend from the first wall 604 to the flange 610 of the housing 602. In other words, a first edge 604c (e.g., an upper edge) of the first wall 604, a first edge 606c (e.g., an upper edge) of the second wall 606, and a first edge 608c (e.g., an upper edge) of the third wall 608, respectively, converge or couple to an upper flange portion 610a of the flange 610. Likewise, a second edge 604d (e.g., a lower edge) of the first wall 604, a second edge 606d (e.g., a lower edge) of the second wall 606, and a second edge 608d (e.g., a lower edge) of the third wall 608, respectively, converge or couple to a lower flange portion 610b of the flange 610. The second wall 606 extends from the first wall 604 to a third portion 610c of the flange and the third wall 608 extends from the first wall 604 to a fourth portion 610d of the flange 610. Thus, the flange 610 has a rectangular shape. The first wall 604 has an arcuate or curved shape. Thus, the housing 602 of the illustrated example has a crescent, cross-sectional shape. The first inner surface 604a, the second inner surface 606a and the third inner surface 608a of the housing 602 define an inner recess 612 (e.g., a cavity or opening).

Figure 7:
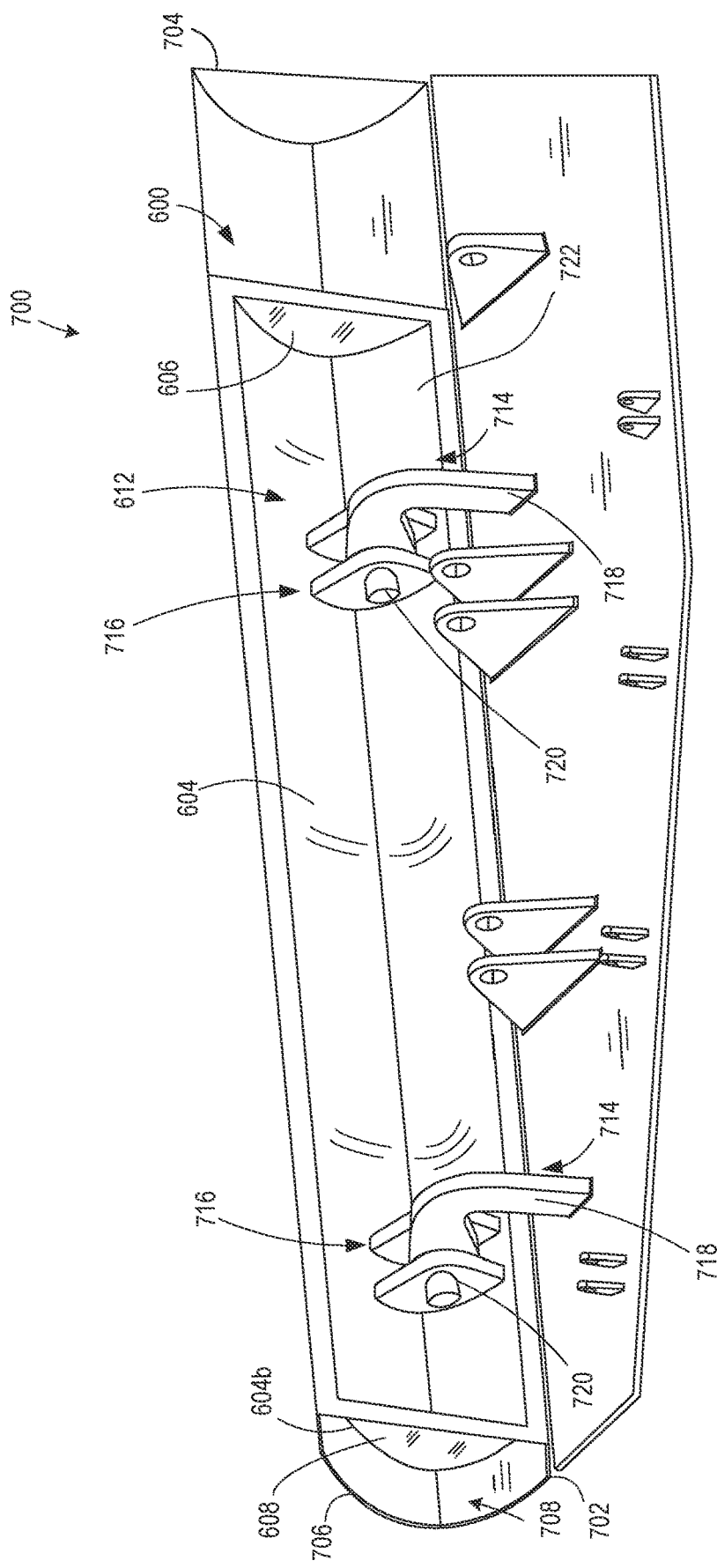
FIG. 7 is a partial, perspective rear view of the example thermal anti-icing system of FIG. 6B shown with an example aircraft wing.

FIG. 7 is a perspective, partial rear view of an aircraft wing 700 implemented with the example thermal anti-icing system 600 of FIGS. 6A and 6B. The housing 602 of the illustrated example has a length in a spanwise direction between an outboard end 702 and an inboard end 704 of the aircraft wing 700. In some examples, the housing 602 has a length that is substantially equal to (e.g., within 10 percent of) a length of a leading edge 706 of the aircraft wing 700. Specifically, the housing 602 of the illustrated example is positioned within a cavity 708 of the aircraft wing 700 adjacent the leading edge 706. When positioned in the cavity 708, the first outer surface 604b of the first wall 604 is oriented toward the leading edge 706. In other words, when positioned in the cavity 708, the first wall 604 protrudes in a direction toward the leading edge 706. In the illustrated example, the arcuate profile or shape of the first wall 604 is similar (e.g., complementary or identical) to an arcuate profile or shape of the leading edge 706 of the aircraft wing 700.

When positioned in the cavity 708, the inner recess 612 is oriented away from the leading edge 706 (e.g., in a direction toward a rear of an aircraft) to receive or pivotally support one or more hinges 714 of a flap (e.g., a Krueger flap) of the aircraft wing 700. To receive or couple to the hinges 714 of the flap of the aircraft wing 700, the inner recess 612 of the illustrated example includes a plurality of clevis connectors 716. The clevis connectors 716 couple to respective hinge fittings 718 of a flap actuation assembly of the flap via pins 720. Thus, the housing 602 (e.g., the clevis connectors 716) provide pivot anchor points for a flap of the aircraft wing 700 to enable the flap to pivot about a pivot axis 722 (e.g., the pivot axis 218 of FIG. 2B). In some examples, the clevis connectors 716 can be welded to the housing 602. In some examples, the clevis connectors 716 can be integrally formed with the housing 602.

Figure 8:
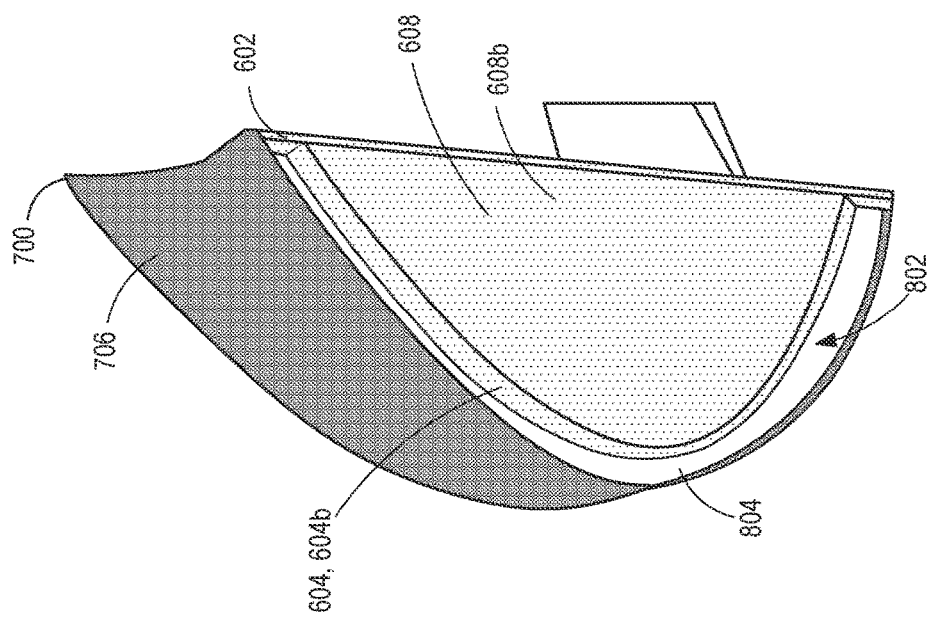
FIG. 8 is a perspective side view of the example thermal anti-icing system and aircraft wing of FIG. 7.

FIG. 8 is a partial, perspective view of the example aircraft wing 700 of FIG. 7. When the housing 602 is positioned in the cavity 708 of the aircraft wing 700, the housing 602 and the leading edge 706 of the aircraft wing 700 define a heating chamber 802 to receive a heating fluid (e.g., engine bleed air) during a thermal anti-icing operation. Specifically, the first outer surface 604b of the first wall 604, the second outer surface 606b (FIG. 6A) of the second wall 606, the third outer surface 608b of the third wall 608, and an inner surface 804 of the leading edge 706 of the aircraft wing 700 define the heating chamber 802. The heating chamber 802 has a profile or shape that is similar to a profile or shape of the leading edge 706 of the aircraft wing 700 and/or the profile or shape of the first wall 604.

Figure 9:
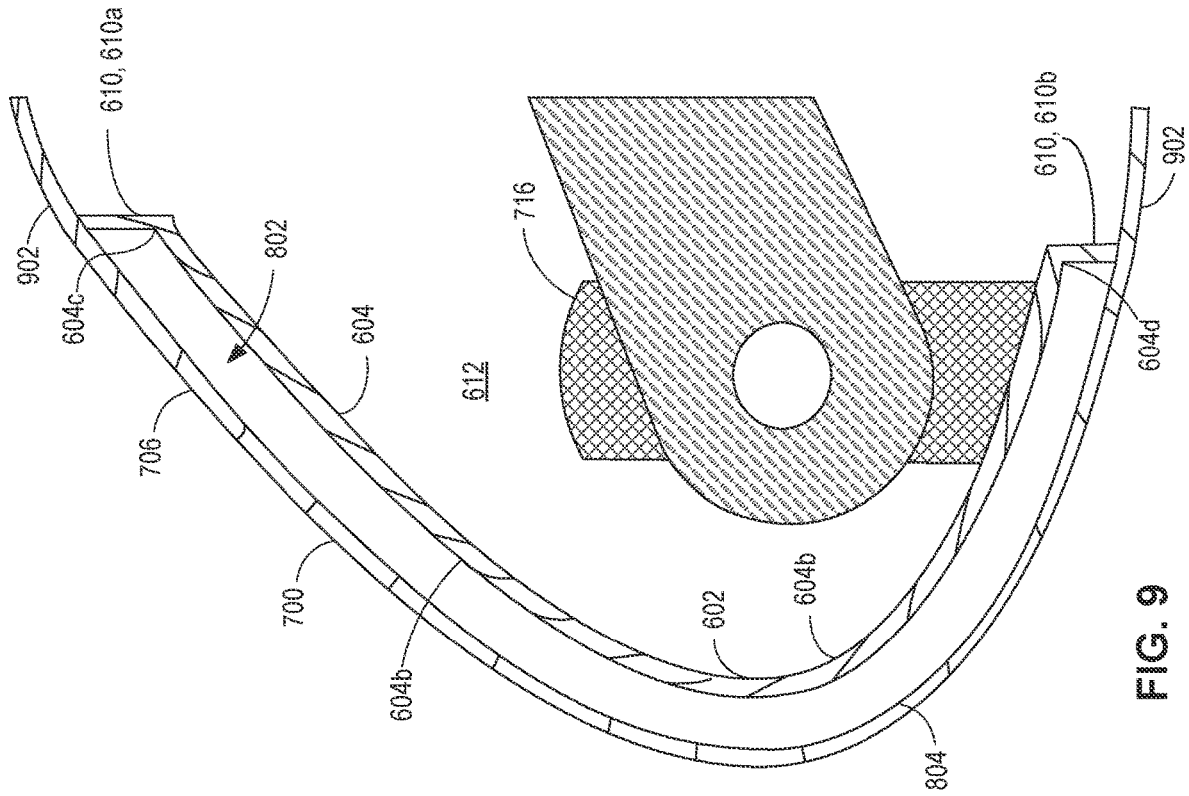
FIG. 9 is a side, cross-sectional view of the example thermal anti-icing system and example aircraft wing of FIGS. 7 and 8.

FIG. 9 is a side, cross-sectional view of the example aircraft wing 700 of FIGS. 7 and 8. The heating chamber 802 formed between the housing 602 and the leading edge 706 of the aircraft wing 700 is separated (e.g., fluidly isolated) from the inner recess 612 that includes the clevis connectors 716. Additionally, the heating chamber 802 is enclosed, and extends along the entire length of the housing 602. During operation, a pressure differential provided by the heating fluid (e.g., pressurized bleed air) flows through the heating chamber 802 between the outboard end 702 and the inboard end 704 of the aircraft wing 700 to apply heat to the leading edge 706 of the aircraft wing 700 for de-icing the leading edge 706 of the aircraft wing 700. Additionally, the housing 602 causes heated air to flow directly on the inner surface 804 of the leading edge 706, which improves heat transfer to the leading edge 706 compared to conventional piccolo systems. Furthermore, the heating chamber 802 is confined to a volume or space between the housing 602 and the leading edge 706 of the aircraft wing 700 and does not allow heated air from flowing in the inner recess 612 and/or an area of the aircraft wing 700 aft of (e.g., the first wall 604 of) of the housing 602. In some examples, a seal (e.g., a gasket, a sealing gel, etc.) can be provided between the first edge 604c of the first wall 604 and/or between the second edge 604d of the first wall 604 and the lower flange portion 610b. As a result, the housing 602 improves efficiency by limiting or confining heated fluid (e.g., bleed air) to an area (e.g., only to an area) of the aircraft wing 700 defining the leading edge 706. Heated bleed air is not directed toward an area 902 of the aircraft wing 700 located aft of the leading edge 706 and/or the flange 610 because such an area of the aircraft wing 700 is not susceptible to icing. Thus, the housing 602 of the illustrated example reduces a volume or space of the aircraft wing 700 requiring heating, which reduces use of bleed air and improves engine efficiency and/or performance.

In some examples, the thermal anti-icing system 600 can be used with aircraft wings irrespective of the accommodating pivot joints, couplings and/or other structures. In other words, the housing 602 can be used instead of (e.g., in place of) a conventional piccolo tube system. The housing 602, defining the heating chamber 802, can reduce adverse effects with fluid conditions (e.g., pressure, improper heat transfer, turbulence, etc.) that may be caused using other thermal anti-icing systems such as a conventional piccolo system.

Although each of the example thermal anti-icing systems 102 and 600 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features. In some examples, the thermal anti-icing system 102 can be used in conjunction with the thermal anti-icing system 600. In some examples, one or more of the components of the thermal anti-icing system 102 (e.g., the first piccolo tube, the first support fitting, the second piccolo tube, the second support fitting, the cover, etc.) can be used with the thermal anti-icing system 600.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that the disclosed thermal anti-icing systems advantageously improves thermal anti-icing efficiency by reducing a volume within an aircraft wing that receives heated bleed air. Specifically, example thermal anti-icing systems disclosed herein advantageously direct heated bleed air only to portions of a leading edge of the aircraft wing that is fore of a housing of the thermal anti-icing system. Additionally, the thermal anti-icing systems disclosed herein provide a bypass around a hinge assembly of high lift system, a flap, a slat, a Krueger flap and/or any other component of an aircraft.

Example 1 is a thermal anti-icing system includes a housing defining an inner recess, a first support fitting, a second support fitting spaced away from the first support fitting. The housing is positioned between the first support fitting and the second support fitting. The first support fitting, the second support fitting and an outer wall of the housing define a heating chamber that is fluidly separated from the inner recess.

Example 2 includes the subject matter of Example 1, where an inner surface of the wing opposite the outer wall of the housing and positioned between the first support fitting and the second support fitting defines a portion of the heating chamber.

Example 3 includes the subject matter of any one of Examples 1 and 2, further including a first piccolo tube and a second piccolo tube, the first piccolo tube to provide heated airflow from a heat source to the heating chamber and the second piccolo tube to provide heated airflow from the heating chamber to portions of the wing downstream from the housing.

Example 4 includes the subject matter of any one of Examples 1-3, where the inner recess of the housing is to support a flap hinge of a Krueger flap.

Example 5 includes the subject matter of any one of Examples 1-4, further including a clevis coupled to the inner recess.

Example 6 includes the subject matter of any one of Examples 1-5, where the clevis defines a pivot axis of the flap hinge.

Example 7 includes the subject matter of any one of Examples 1-6, where the inner recess of the housing has a length in a spanwise direction to enable a pin of the flap hinge to be positioned between a fully removed position relative to the clevis and a fully inserted position relative to the clevis to couple a hinge fitting of the Krueger flap and the clevis.

Example 8 includes the subject matter of any one of Examples 1-7, where the housing has a crescent cross-sectional shape.

Example 9 includes the subject matter of any one of Examples 1-8, where a flange, a first wall protruding from the flange, a second wall extending between the first wall and the flange, and a third wall extending between the first wall and the flange, the third wall positioned opposite the second wall.

Example 10 includes the subject matter of any one of Examples 1-9, where inner surfaces of the first wall, the second wall and the third wall, respectively, define the inner recess.

Example 11 includes the subject matter of any one of Examples 1-10, where outer surfaces of the respective first wall, the second wall and the third wall of the housing, inner surfaces of the respective first and second support fittings, and an inner surface of a leading edge of the wing between the first and second support fittings define the heating chamber.

Example 12 is a thermal anti-icing system including a housing having: a first wall defining a first inner surface and a first outer surface opposite the first inner surface; a second wall defining a second inner surface and a second outer surface opposite the second inner surface, the second wall extending from the first wall; and a third wall defining a third inner surface and a third outer surface opposite the third inner surface. The third wall extends from the first wall and positioned opposite the first wall. The first inner surface, the second inner surface and the third inner surface of the housing define an inner recess to receive a hinge fitting of a flap of a wing. The first outer surface, the second outer surface, the third outer surface of the housing and an inner surface of a wing define a heating chamber. The heating chamber located between the first outer surface of the first wall and the inner surface of the wing to receive heated airflow when the housing is positioned in the wing of the aircraft.

Example 13 includes the subject matter of Example 12, where the housing has a length in a spanwise direction between an outboard end and an inboard end of the wing.

Example 14 includes the subject matter of any one of Examples 12-13, further including a first support fitting positioned upstream from the housing and a second support fitting positioned downstream from the housing.

Example 15 includes the subject matter of any one of Examples 12-14, where the first support fitting defines an inlet of the heating chamber and the second support fitting defines an outlet of the heating chamber.

Example 16 includes the subject matter of any one of Examples 12-15, where a fourth inner surface of the first support fitting, a fifth inner surface of the second support fitting, the second outer surface of the second wall, the third outer surface of the third wall, and the first outer surface of the first wall define at least a portion of the heating chamber.

Example 17 includes the subject matter of any one of Examples 12-16, where the inner recess does not define the heating chamber.

Example 18 includes the subject matter of any one of Examples 12-17, where the first wall is positioned between the heating chamber and the inner recess.

Example 19 is a thermal anti-icing system including a housing interposed between a leading edge of a wing and a flap hinge of a flap of the wing. The housing has a crescent-shaped cross-section to define a heating chamber between leading edge of the wing and a first surface of the housing oriented toward the leading edge. The housing defines a recess oriented toward the flap hinge to receive at least a portion of the flap hinge. The housing fluidly separates the heating chamber and the recess.

Example 20 includes the subject matter of Example 19, further including a first piccolo tube to carry heated air from a heat source to the heating chamber and a second piccolo tube to carry heated air from the heating chamber to a portion of the leading edge of the wing downstream from the housing. A first support fitting receives the first piccolo tube at an inlet of the heating chamber, and a second support fitting receives the second piccolo tube at an outlet of the heating chamber. The first support fitting and the second support fitting define a portion of the heating chamber.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A thermal anti-icing system for a wing of an aircraft, the thermal anti-icing system comprising:
   a housing having an inner surface and an outer surface opposite the inner surface, the inner surface defining an inner recess;
   a first support fitting coupled to a first side of the housing; and
   a second support fitting coupled to a second side of the housing opposite the first side, the housing positioned between the first support fitting and the second support fitting, the first support fitting, the second support fitting and the outer surface of the housing defining a heating chamber fluidly separated from the inner recess, the first support fitting providing an inlet of the heating chamber, the outer surface of the housing to channel heated airflow between the first support fitting and the second support fitting.

2. The thermal anti-icing system of claim 1, wherein an inner surface of the wing opposite the outer surface of the housing and positioned between the first support fitting and the second support fitting defines a portion of the heating chamber.

3. The thermal anti-icing system of claim 1, further including a first piccolo tube and a second piccolo tube, the first piccolo tube to provide heated airflow from a heat source to the heating chamber and the second piccolo tube to provide heated airflow from the heating chamber to portions of the wing downstream from the housing.

4. The thermal anti-icing system of claim 1, wherein the inner recess of the housing is to support a flap hinge of a Krueger flap.

5. The thermal anti-icing system of claim 4, further including a clevis coupled to the inner recess.

6. The thermal anti-icing system of claim 5, wherein the clevis defines a pivot axis of the flap hinge.

7. The thermal anti-icing system of claim 5, wherein the inner recess of the housing has a length in a spanwise direction to enable a pin of the flap hinge to be positioned between a fully removed position relative to the clevis and a fully inserted position relative to the clevis to couple a hinge fitting of the Krueger flap and the clevis.

8. The thermal anti-icing system of claim 1, wherein the housing has a crescent cross-sectional shape.

9. The thermal anti-icing system of claim 1, wherein the housing includes:
a flange;
a first wall protruding from the flange;
a second wall extending between the first wall and the flange; and
a third wall extending between the first wall and the flange, the third wall positioned opposite the second wall.

10. The thermal anti-icing system of claim 9, wherein inner surfaces of the first wall, the second wall and the third wall, respectively, define the inner recess.

11. The thermal anti-icing system of claim 10, wherein outer surfaces of the respective first wall, the second wall and the third wall of the housing, inner surfaces of the respective first and second support fittings, and an inner surface of a leading edge of the wing between the first and second support fittings define the heating chamber.

12. A thermal anti-icing system for an aircraft comprising:
a housing including:
a first wall defining a first inner surface and a first outer surface opposite the first inner surface;
a second wall defining a second inner surface and a second outer surface opposite the second inner surface, the second wall extending from the first wall;
a third wall defining a third inner surface and a third outer surface opposite the third inner surface, the third wall extending from the first wall and positioned opposite the second wall, wherein the first inner surface, the second inner surface and the third inner surface of the housing define an inner recess to receive a hinge fitting of a flap of a wing, and wherein the first outer surface, the second outer surface, the third outer surface of the housing and an inner surface of a wing define walls of a heating chamber, the heating chamber to channel heated airflow through the heating chamber, the heating chamber located between the first outer surface of the first wall and the inner surface of the wing to receive heated airflow when the housing is positioned in the wing of the aircraft; and
a first support fitting defining an inlet of the heating chamber.

13. The thermal anti-icing system of claim 12, wherein the housing has a length in a spanwise direction between an outboard end and an inboard end of the wing.

14. The thermal anti-icing system of claim 12, wherein the housing further includes a second support fitting.

15. The thermal anti-icing system of claim 14, wherein the second support fitting defines an outlet of the heating chamber.

16. The thermal anti-icing system of claim 15, wherein a fourth inner surface of the first support fitting, a fifth inner surface of the second support fitting, the second outer surface of the second wall, the third outer surface of the third wall, and the first outer surface of the first wall define at least a portion of the heating chamber.

17. The thermal anti-icing system of claim 12, wherein the inner recess does not define the heating chamber.

18. The thermal anti-icing system of claim 12, wherein the first wall is positioned between the heating chamber and the inner recess.

19. A thermal anti-icing system for a wing of an aircraft comprising:
a housing to be positioned in a cavity adjacent a leading edge of the wing, the housing to be interposed between a leading edge of the wing and a flap hinge of a flap of the wing, the housing having a crescent-shaped cross-section, the housing to define walls of a heating chamber to channel fluid between the leading edge of the wing and a first surface of the housing oriented toward the leading edge, the housing defining a recess oriented toward the flap hinge to receive at least a portion of the flap hinge, the housing to fluidly separate the heating chamber and the recess;
a first support fitting defining an inlet of the heating chamber; and
a second support fitting defining an outlet of the heating chamber, the outlet to allow the heated fluid from within the housing to exit the heating chamber.

20. The thermal anti-icing system of claim 19, further including:
a first piccolo tube to carry heated air from a heat source to the heating chamber;
a second piccolo tube to carry heated air from the heating chamber to a portion of the leading edge of the wing downstream from the housing; and
the second support fitting to receive the second piccolo tube at the outlet of the heating chamber, the first support fitting receiving the first piccolo tube at the inlet of the heating chamber, the first support fitting and the second support fitting defining a portion of the heating chamber.

21. A thermal anti-icing system for a wing of an aircraft, the thermal anti-icing system comprising:
a housing having an inner surface and an outer surface opposite the inner surface, the inner surface defining an inner recess, the housing positioned in a cavity of the wing adjacent a leading edge of the wing;
a first support fitting coupled to a first side of the housing; and
a second support fitting coupled to a second side of the housing opposite the first side, the housing positioned between the first support fitting and the second support fitting, the first support fitting, the second support fitting and the outer surface of the housing defining a heating chamber fluidly separated from the inner recess, the first support fitting providing an inlet of the heating chamber.

22. The thermal anti icing system of claim 21, wherein an inner surface of the wing opposite the outer surface of the housing and positioned between the first support fitting and the second support fitting defines a portion of the heating chamber.

* * * * *